United States Patent
Kim et al.

(10) Patent No.: US 7,423,700 B2
(45) Date of Patent: Sep. 9, 2008

(54) LIQUID CRYSTAL DEVICE FOR COMPENSATING FOR ABERRATION, OPTICAL PICKUP INCLUDING LIQUID CRYSTAL DEVICE, AND OPTICAL RECORDING AND/OR REPRODUCING APPARATUS EMPLOYING OPTICAL PICKUP

(75) Inventors: Tae-kyung Kim, Seoul (KR); Hee-kyung Kim, Anyang-si (KR); Woo-seok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 11/324,466

(22) Filed: Jan. 4, 2006

(65) Prior Publication Data

US 2006/0146206 A1 Jul. 6, 2006

(30) Foreign Application Priority Data

Jan. 5, 2005 (KR) ...................... 10-2005-0000821

(51) Int. Cl.
 *G02F 1/13* (2006.01)
(52) U.S. Cl. .............................. 349/2; 349/187; 349/84; 349/85; 349/93
(58) Field of Classification Search ...................... 349/2, 349/75, 84, 85, 87, 88, 89, 93, 94, 117, 187, 349/192
See application file for complete search history.

(56) References Cited

U.S. PATENT DOCUMENTS 6,636,291 B2 * 10/2003 Van De Witte et al. ...... 349/187
6,813,082 B2 * 11/2004 Bruns .......................... 359/589
6,909,686 B2 * 6/2005 Iwasaki et al. .......... 369/112.02
2004/0170107 A1 9/2004 Iwasaki et al. .......... 369/112.02
2006/0146206 A1 * 7/2006 Kim et al. ....................... 349/2
2006/0152638 A1 * 7/2006 Choi et al. ...................... 349/2

FOREIGN PATENT DOCUMENTS

JP 6-160818 6/1994 ................ 349/2 X
JP 9-50642 2/1997 ................ 349/2 X (Continued)

OTHER PUBLICATIONS

Office Action issued in Korean Patent Application No. 2005-821 on May 9, 2006.

*Primary Examiner*—Brian M Healy
(74) *Attorney, Agent, or Firm*—Stein, McEwen & Bui, LLP

(57) ABSTRACT

Provided are an aberration-compensating liquid crystal device, a method of manufacturing the same, an optical pickup including the liquid crystal device, and an optical recording and/or reproducing apparatus employing the optical pickup. The method of manufacturing an aberration-compensating liquid crystal device comprises: positioning a gray scale mask having an absorption rate distribution corresponding to that of aberrations to be corrected on a liquid crystal cell containing a mixture of liquid crystals and monomers injected between a pair of transparent substrates; and irradiating the liquid crystal cell on which the gray scale mask has been positioned with UV light so that the monomers undergo photopolymerization into polymer and phase separation into a polymer-existing region and a liquid crystal-existing region, thereby forming a liquid crystal layer having a phase difference distribution corresponding to that of aberrations to be corrected.

36 Claims, 16 Drawing Sheets

FOREIGN PATENT DOCUMENTS

| | | | | |
|---|---|---|---|---|
| JP | 9-274174 | 10/1997 | ................ | 349/2 X |
| JP | 2004-71081 | 3/2004 | ................ | 349/2 X |
| JP | 2004-103093 | 4/2004 | ................ | 349/2 X |
| JP | 2004-110959 | 4/2004 | ................ | 349/2 X |
| JP | 2004-138900 | 5/2004 | ................ | 349/2 X |
| KR | 1998-14883 | 5/1998 | ................ | 349/2 X |

* cited by examiner

LIQUID CRYSTAL DEVICE FOR COMPENSATING FOR ABERRATION, OPTICAL PICKUP INCLUDING LIQUID CRYSTAL DEVICE, AND OPTICAL RECORDING AND/OR REPRODUCING APPARATUS EMPLOYING OPTICAL PICKUP

CROSS-REFERENCE TO RELATED APPLICATIONS

This application claims all benefits accruing under 35 U.S.C. §119 from Korean Patent Application No. 2005-821, filed on Jan. 5, 2005, in the Korean Intellectual Property Office, the disclosure of which is incorporated by reference herein.

BACKGROUND OF THE INVENTION

1. Field of the Invention

The present invention relates to an optical recording and/or reproducing apparatus, and more particularly, to a liquid crystal device for compensating for aberration, an optical pickup including the liquid crystal device, and an optical recording and/or reproducing apparatus employing the optical pickup.

2. Related Art

Generally, in an optical recording and/or reproducing apparatus for recording and/or reproducing information to and/or from an optical disc, that is, an optical information storage medium using a beam spot to which an objective lens focuses a laser beam, the recording capacity of an optical disc is determined by the size of the focused beam spot, which is proportional to the wavelength $\lambda$ of a laser beam and inversely proportional to the numerical aperture (NA) of objective lens. Equation (1) defines a beam spot size S that is determined by a wavelength $\lambda$ of a laser beam used and a numerical aperture (NA) of the objective lens:

$$S \propto \lambda / NA \qquad (1)$$

Therefore, to reduce the beam spot size S for increasing the optical disc's recording density, it is necessary to use a shorter wavelength light source such as a blue laser and an objective lens with NA higher than 0.6.

Since the emergence of a CD technology designed to record and/or reproduce information using light of 780 nm wavelength and objective lens with NA of 0.45 or 0.5, much research has been conducted to increase data storage capacity by increasing the area recording density, and has resulted in a DVD technology designed to record and/or reproduce information using light of 650 nm wavelength and objective lens with NA of 0.6 or 0.65.

Currently, studies are now underway to develop a next-generation high density optical disc system that can offer over 20 GB recording capacity using blue light of a predetermined wavelength, e.g., 405 nm. Standards on high density optical discs are still actively under development, some of which are almost finalized.

The standards specify use of blue light of 405 nm wavelength and an objective lens with NA of 0.65 or 0.85 that will be described below. The standards also set a thickness of a DVD disc to 0.6 mm that is 50% less than 1.2 mm of a CD disc. This is intended at providing a tolerance due to a tilt of the optical disc since NA of objective lens in DVD standards increases to 0.6 that is higher than 0.45 of objective lens in CD standards.

Furthermore, if the NA of the objective lens is increased to 0.85, for example, for a high density optical disc with storage capacity higher than that of a DVD, the thickness of the high density optical disc must be reduced to about 0.1 mm. A blu-ray disc (BD) standard is a recording technology that increases NA of an objective lens while reducing the thickness of an optical disc in this way. A BD standard specifies a 405 nm wavelength light source, 0.85 NA objective lens, and about 0.1 mm thickness of an optical disc.

The thickness of an optical disc refers to a distance between an incident surface and a recording surface. For CD or DVD, the thickness of an optical disc is approximately equal to a substrate thickness. For BD, the thickness of an optical disc is approximately equal to the thickness of a cover layer.

It is known that a margin for an optical disc thickness error allowable in a BD system currently available is small value of 3 μm. Spherical aberration produced when a deviation of the thickness of the optical disc exceeds the margin may significantly degrade the quality of recorded and/or reproduced signal.

Therefore, an optical element for compensating for spherical aberration contained in an optical signal being recorded and reproduced is needed for an optical disc such as a BD with a small allowable thickness difference. In particular, a high density optical disc system using a cover layer with a thickness of approximately 0.1 mm and an objective lens with a NA of 0.85 highly requires an optical element for compensating for spherical aberration induced when the thickness of the optical disc deviates from the standard.

An optical pickup compatibly applying a CD, a DVD, and a high density optical disc also requires an optical element for compensating for chromatic aberration induced by a difference between wavelengths emitted by a light source as well as spherical aberration caused by a difference between thicknesses of the optical discs. Here, the high density optical disc is a blu-ray disc (BD) or a high definition digital versatile disc (HD DVD). The HD DVD uses a light source with 405 nm wavelength and an objective lens with 0.65 NA. The thickness of a substrate is 0.6 mm like in the DVD.

Conventionally, a liquid crystal panel is used to reduce and compensate for spherical aberration by creating a phase difference distribution of an opposite sign to spherical aberration introduced by an optical pickup by applying an electric field. The liquid crystal panel is connected to a driving circuit by lead wires.

Such an aberration-compensating liquid crystal panel is formed by homogeneous rubbing, that is, a process to align liquid crystal molecules parallel to a substrate before applying an electric field. An indium tin oxide (ITO) electrode is patterned to correspond to the distribution of aberrations. Spherical aberration is corrected by applying an electric field to the conventional liquid crystal panel to generate a phase difference of an opposite sign to spherical aberration.

One conventional approach to ITO electrode patterning involves patterning an ITO film into electrodes and depositing thin lines of higher conductivity electrodes on edges of the patterned ITO electrodes. An example of a liquid crystal panel provided with patterned ITO electrodes for compensating for spherical aberration is presented in the Japanese Laid-open Patent Application 2004-110959.

However, a method of manufacturing the conventional liquid crystal panel is complicated. This is because a process of patterning metal line electrodes is additionally required, after patterning the ITO electrodes to obtain electric field distribution that is coincident with the distribution of spherical aberrations. In addition, an individual lead wire and a driving circuit that separately operates are needed for each patterned electrode.

The liquid crystal panel with a patterned electrode structure for compensating for aberration further requires individual interconnect wire and driving circuit for driving each patterned electrode, thus leading to even more complicated interconnection and driving structure.

Furthermore, the structure in which metal line electrodes are added after formation of patterned ITO electrodes cannot achieve compensation of spherical aberration at a small interval between each patterned electrode. This also results in reduction in transmittance of light through the metal line electrodes.

SUMMARY OF THE INVENTION

Various aspects and example embodiments of the present invention advantageously provide an aberration compensating liquid crystal device that allows simple electrode interconnection and driving by eliminating the need for electrode patterning and a method of manufacturing the same, an optical pickup including the liquid crystal device, and an optical recording and/or reproducing apparatus employing the optical pickup.

Additional aspects and/or advantages of the invention will be set forth in part in the description which follows and, in part, will be obvious from the description, or may be learned by practice of the invention.

According to an aspect of the present invention, there is provided a method of manufacturing an aberration-compensating liquid crystal device, comprising: positioning a gray scale mask having an absorption rate distribution corresponding to that of aberrations to be corrected on a liquid crystal cell containing a mixture of liquid crystals and monomers injected between a pair of transparent substrates; and irradiating the liquid crystal cell on which the gray scale mask has been positioned with UV light so that the monomers undergo photopolymerization into polymer and phase separation into a polymer-existing region and a liquid crystal-existing region, thereby forming a liquid crystal layer between the substrate having a phase difference distribution corresponding to that of aberrations to be corrected.

The liquid crystal layer may be formed to have a nano polymer dispersed liquid crystal (PDLC) structure where the size and density distribution of liquid crystal droplets corresponds to that of the aberrations to be corrected.

The gray scale mask may have a positive- or negative-type two-dimensional (2-D) parabolic absorption rate distribution or an absorption rate distribution corresponding to a predicted distribution of at least one of spherical aberration caused by a thickness difference in an optical information storage medium, spherical aberration introduced by a thickness difference in the optical information storage medium when the working distance of an objective lens changes, coma aberration caused by a tilt of the optical information storage medium, and coma aberration introduced by the tilt of the optical information storage medium when the objective lens shifts.

The liquid crystal layer has a polymer network liquid crystal (PNLC) structure in which monomers are polymerized to form a polymer network and liquid crystals are entrapped in the polymer network.

According to another aspect of the present invention, there is provided a liquid crystal device for compensating for aberration comprising: a pair of transparent substrates; and a liquid crystal layer formed between the substrates having a phase difference distribution corresponding to the distribution of aberrations to be corrected, wherein the liquid crystal layer is formed by positioning a gray scale mask having an absorption rate distribution corresponding to the distribution of aberrations to be corrected on a liquid crystal cell containing a mixture of liquid crystals and monomers injected between the substrates; and irradiating the liquid crystal cell on which the gray scale mask has been positioned with UV light so that the monomers undergo photopolymerization into polymer and phase separation into a polymer-existing region and a liquid crystal-existing region.

According to another aspect of the present invention, there is provided an optical pickup comprising a light source, an objective lens arranged to focus light emitted by the light source to a spot on an optical information storage medium, a photo-detector arranged to receive light reflected from the optical information storage medium and detect an information signal and/or an error signal, and a liquid crystal device arranged to compensate for aberration, wherein the liquid crystal device is manufactured by the above manufacturing method.

The liquid crystal layer in the liquid crystal device may be formed to have a PDLC structure where the size and density distribution of liquid crystal droplets corresponds to that of the aberrations to be corrected. Alternatively, the liquid crystal layer may be formed to have a PNLC structure in which monomers are polymerized to form a polymer network and liquid crystals are entrapped in the polymer network.

The liquid crystal device may include a first liquid crystal device correcting aberration for light incident on an information storage surface of the optical information storage medium, and a second liquid crystal device correcting aberration for light reflected from the information storage surface to the photodetector.

The optical pickup may further include a waveplate that is disposed between either the first or the second liquid crystal device and the objective lens and changes the polarization of incident light.

The liquid crystal device may have a phase difference distribution that can compensate for at least one of spherical aberration caused by a thickness difference in the optical information storage medium, spherical aberration introduced by a thickness difference in the optical information storage medium when the working distance of the objective lens changes, coma aberration caused by a tilt of the optical information storage medium, and coma aberration introduced by the tilt of the optical information storage medium when the objective lens shifts. Alternatively, the liquid crystal device may have a positive- or negative-type 2-D parabolic phase difference distribution.

According to another aspect of the present invention, there is provided an optical recording and/or reproducing apparatus including an optical pickup that is installed movably along a radial direction of an optical information storage medium and reproduces and/or records information from and/or on the optical information storage medium and a controller controlling the optical pickup, wherein the optical pickup is the above-mentioned optical pickup.

According to yet another aspect of the present invention, there is provided an optical pickup comprising a light source; an objective lens arranged to focus light emitted from the light source on an optical information storage medium; a photo-detector arranged to receive light reflected from the optical information storage medium and detect an information signal and/or an error signal; a first liquid crystal device arranged such that a direction of polarization of light emitted from the light source is coincident with a major axis direction of liquid crystal molecules included therein before an application of an electric field in order to correct aberration of light incident on a surface of the optical information storage medium; and a second liquid crystal device arranged such that a direction of polarization of light reflected from the surface of the optical information storage medium is coincident with a major axis direction of liquid crystal molecules included thereto in order to correct aberration of light reflected from the surface of the optical information storage medium to the photo-detector.

Each of the first and second liquid crystal devices may comprise a pair of substrates; and a liquid crystal layer formed between the substrates having a phase difference distribution corresponding to the distribution of aberrations to be corrected, wherein the liquid crystal layer is formed by positioning a gray scale mask having an absorption rate distribution corresponding to a predicted distribution of aberrations to be corrected on a liquid crystal cell containing a mixture of liquid crystals and monomers injected between the substrates; and irradiating the liquid crystal cell on which the gray scale mask has been positioned with UV light so that the monomers undergo photopolymerization into polymer and phase separation into a polymer-existing region and a liquid crystal-existing region.

The liquid crystal layer in the first and second liquid crystal devices may also be formed to be a polymer network liquid crystal (PNLC) structure in which monomers are polymerized to form a polymer network and liquid crystals are entrapped in the polymer network.

In addition, a waveplate may be disposed between either the first or the second liquid crystal device and the objective lens, to change the polarization of incident light. Each of the first and second liquid crystal devices has a phase difference distribution that can compensate for at least one of spherical aberration caused by a thickness difference in the optical information storage medium, spherical aberration introduced by a thickness difference in the optical information storage medium when the working distance of the objective lens changes, coma aberration caused by a tilt of the optical information storage medium, and coma aberration introduced by the tilt of the optical information storage medium when the objective lens shifts. Each of the first and second liquid crystal devices has a positive- or negative-type two-dimensional (2-D) parabolic phase difference distribution.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

A liquid crystal device for compensating for aberration and a method of manufacturing the same, an optical pickup including the liquid crystal device, and an optical recording and/or reproducing apparatus according to embodiments of the present invention will now be described more fully with reference to the accompanying drawings.

Hereinafter, the thickness of an optical disc (optical information storage medium) refers to a thickness from a light incident surface of the optical disc on which a recording and/or reproducing beam is incident to a target recording layer. A thickness difference in the optical disc refers to a difference from a thickness for which an objective lens is designed.

Figure 1:
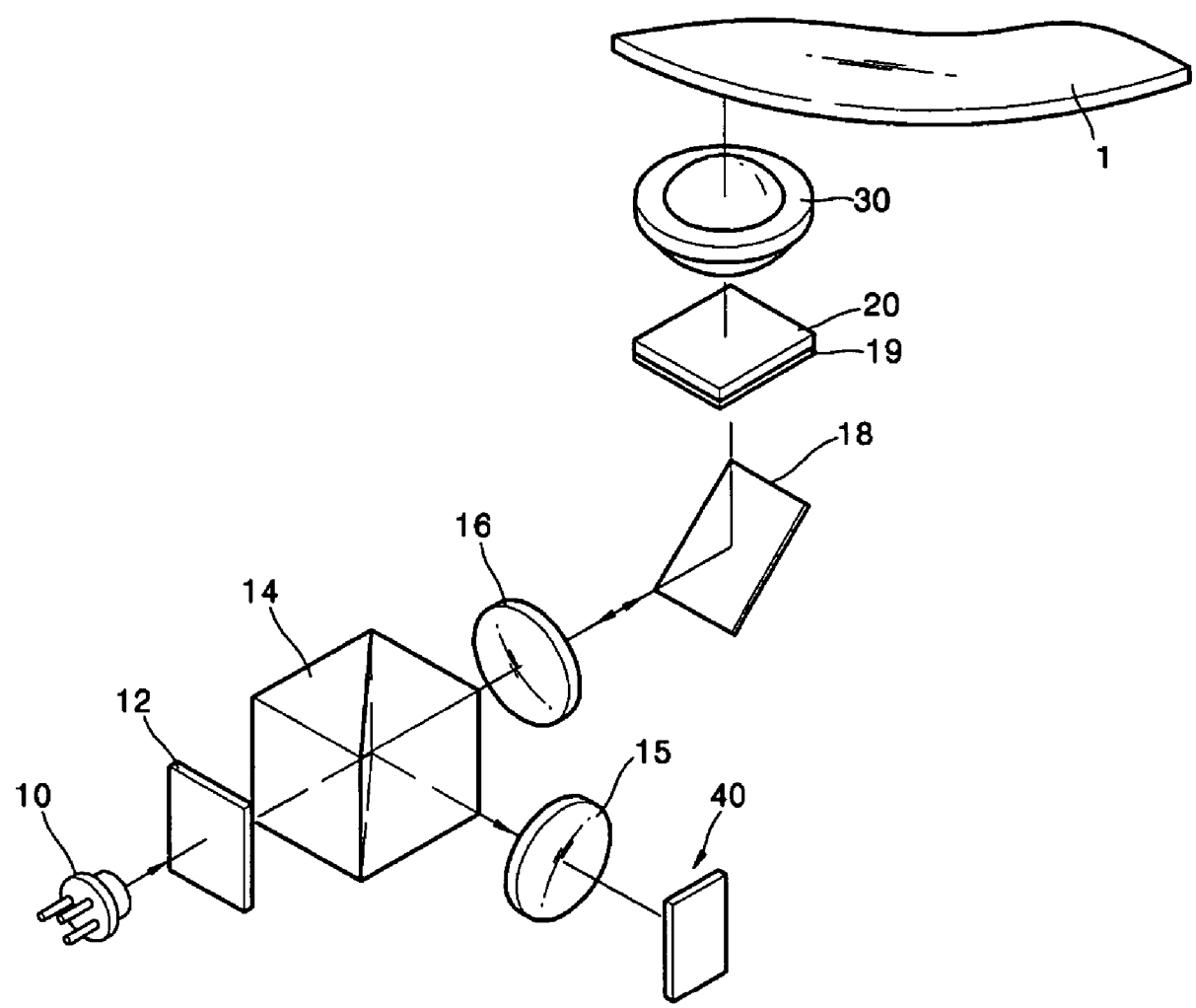
FIG. 1 shows the configuration of an optical pickup including an aberration-compensating liquid crystal device according to a first embodiment of the present invention.

Turning now to FIG. 1, an optical pickup including an aberration-compensating liquid crystal device according to a first embodiment of the present invention is illustrated. As shown in FIG. 1, an optical pickup includes a light source 10, an objective lens 30 for focusing a beam emitted by the light source 10 to a spot on a recording medium, i.e., an optical disc 1, a liquid crystal device 20 for providing compensating for aberration, and a photo-detector 40 for receiving a beam reflected from the optical disc 1 and detecting an information signal and/or an error signal.

To satisfy the demand for a high efficiency optical recording system, the optical pickup may further include a polarization-dependent light path changer such as a polarization beam splitter 14 for changing the propagation path of an incident beam depending on its polarization, and a quarter waveplate 19 for changing the polarization of an incident beam.

The optical pickup further includes a grating 12 for splitting light emitted by the light source 10 for detection of a tracking error signal using a three-beam method or differential push-pull (DPP) method, a collimating lens 16 for collimating a divergent beam emitted by the light source 10 to a parallel beam so that it is incident on the objective lens 30, an astigmatic lens 15 for introducing astigmatism so as to detect a focus error signal by an astigmatic method, and a reflective mirror 18 for turning the propagation path of an incoming beam.

The light source 10 may emit light of a predetermined wavelength, e.g., blue light of 405 nm wavelength. The objective lens 30 may have a high numerical aperture (NA) of about 0.85 that satisfies a blu-ray disc (BD) standard. When the light source 10 emits blue light and the objective lens 30 has an NA of 0.85 as described above, the optical pickup of the present invention can record and/or reproduce the high density optical disc 1, and in particular, the optical disc 1 complying the BD standard. However, various changes in the wavelength of the light source 10 and NA of the objective lens 30 may be made. Moreover, the optical pickup of the present invention may have other various configurations.

For example, to record and/or reproduce information on and/or from a DVD disc with a plurality of recording layers per side using the optical pickup of the present invention, the light source 10 may emit red light suitable for DVD, e.g., light with 650 nm wavelength, and the objective lens 30 may have an NA of 0.65 suitable for the DVD.

Furthermore, to achieve compatibility among BD, HD DVD, and DVD formats, the optical pickup of the present invention may include a light source module that emits light with a plurality of wavelengths, e.g., blue light suitable for a high density optical disc and red light suitable for a DVD disc. To achieve the same purpose, the objective lens 30 may be designed to achieve effective NAs suitable for BD and DVD, or the optical pickup may further include a separate element for adjusting effective NAs.

The optical pickup of the present invention may include separate optical elements for recording to and/or reproducing from a DVD and/or CD disc in addition to the optical configuration shown in FIG. 1 for recording to and/or reproducing from the high density optical disc 1.

The light source 10 and the objective lens 30 may be designed to record and/or reproduce information on and/or from DVD and CD discs as well.

The polarization-dependent light path changer allows a beam incident from the light source 10 to go toward the objective lens 30 while allowing the beam reflected from the optical disc 1 to reach the photo-detector 40. As shown in FIG. 1, the polarization-dependent light path changer is a polarization beam splitter 14 arranged between the grating 12 and the collimating lens 15 to selectively transmit or reflect the incident beam depending on the polarization. Alternatively, the polarization-dependent light path changer may be a polarization holographic optical element that transmits one polarized beam emitted from the light source 10 while diffracting the other polarized beam reflected from the optical disc 1 into plus or minus first-order beams.

The waveplate 19 may be a quarter (¼) waveplate with respect to wavelength of the light emitted from the light source 10. The aberration-compensating liquid crystal device 20 includes a liquid crystal layer having a phase difference distribution corresponding to the distribution of aberrations to be corrected by separation of a polymer-existing region and a liquid crystal-existing region. The liquid crystal device 20 may be manufactured according to a method that will be described later with reference to FIG. 4A.

The liquid crystal layer in the liquid crystal device 20 is formed to have nano polymer dispersed liquid crystal (PDLC) structure where the size and density distribution of liquid crystal droplets corresponds to that of aberrations to be corrected. The nano PDLC structure refers to a structure in which nanometer-sized liquid crystal droplets are dispersed in a polymer, which will be described in more detail later.

The liquid crystal device 20 with the nano PDLC structure can give a phase difference regardless of the polarization of incident light when an electric field is applied since liquid crystal droplets are on the nano-scale, e.g., several ten nanometers to several hundred nanometers, for example. That is, the liquid crystal device 20 can give a phase difference independently of the polarization of incident light. The polarization-independent liquid crystal device 20 may not require separate rubbing of an alignment layer during its manufacturing.

When an electric field is applied to the liquid crystal device 20 by a driving circuit (not shown), the alignment of liquid crystal molecules is altered to obtain a phase difference distribution that is opposite to that of aberrations to be corrected.

While FIG. 1 shows that the liquid crystal device 20 is disposed between the waveplate 19 and the objective lens 30, such a liquid crystal device 20 may be disposed between the polarization beam splitter 14 and the waveplate 19. In addition, since the liquid crystal device 20 is polarization-independent, the waveplate 19 may not be required.

A divergent beam emitted by the light source is changed into a parallel beam by the collimating lens 16 and is incident on the objective lens 30. The parallel beam is also incident on the liquid crystal device 20.

Thus, as will be described later, to compensate for spherical aberration due to a thickness difference in the optical disc 1, which is proportional to $r^4$, the liquid crystal device 20 is designed to have a phase difference distribution that is opposite to that of the spherical aberration. r is distance from an optical axis in the radial direction.

Alternatively, spherical aberration caused by a thickness difference in the optical disc 1 can be corrected by designing the liquid crystal device 20 to have a negative- or positive-type parabolic phase difference distribution so that the divergence angle of light being incident on the objective lens 30 is adjusted. This is based on a well-known fact that spherical aberration caused by the thickness difference can be corrected when a diverging or converging beam proportional to $r^2$ is incident on the objective lens 30.

In this case, the divergence angle of light can be adjusted by adjusting the position of the collimating lens 16 along an optical axis or using a separate lens (not shown).

In the optical pickup having the configuration shown in FIG. 1, correction of aberration can be achieved by creating a phase difference distribution that is opposite to that of spherical aberrations to be corrected by the liquid crystal device 20.

Therefore, light for which aberration has been corrected is focused to a spot on a recording surface of the optical disc 1. Light reflected from the recording surface of the optical disc 1 contains inverse aberration caused by the phase difference distribution created by the liquid crystal device 20. Because the liquid crystal device 20 creates phase difference distribution regardless of polarization, the inverse aberration contained in the reflected light is corrected as the light again passes through the liquid crystal device 20. Thus, no aberration caused by a phase difference created to correct aberration remains in light received by the photo-detector 40.

Figure 2:
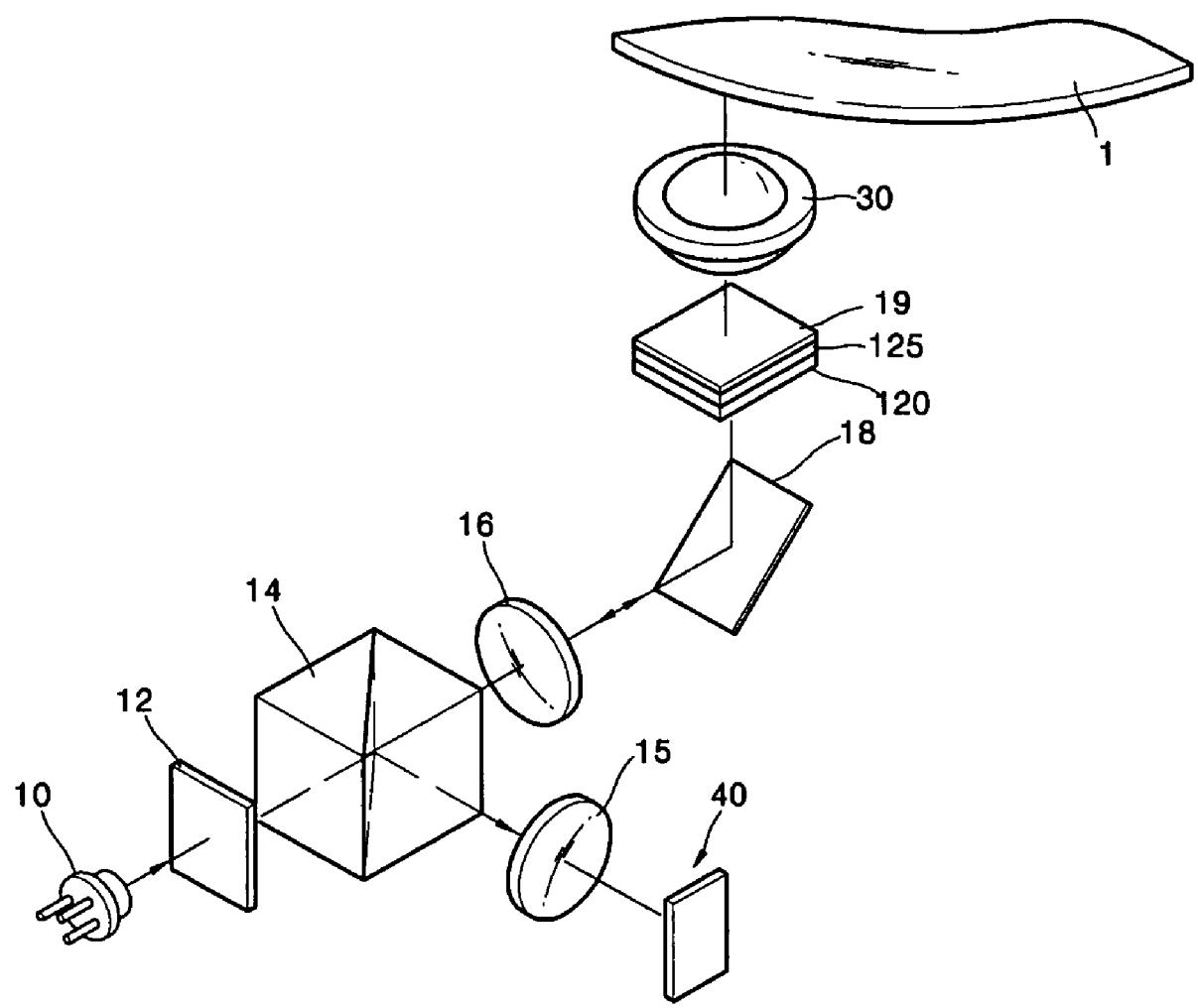
FIG. 2 shows the configuration of an optical pickup including an aberration-compensating liquid crystal device according to a second embodiment of the present invention.

FIG. 2 shows the configuration of an optical pickup including an aberration-compensating liquid crystal device according to a second embodiment of the present invention. Like reference numerals in FIGS. 1 and 2 denote like elements, so their description will not be repeated herein.

Referring to FIG. 2, a pair of liquid crystal devices 120 and 125 is utilized to compensate for aberration. Specifically, a first liquid crystal device 120 for compensating for aberration includes a liquid crystal layer having a phase difference distribution corresponding to the distribution of aberrations to be corrected by separation into a polymer-existing region and a liquid crystal-existing region. The liquid crystal layer has a polymer network liquid crystal (PNLC) structure in which monomers are polymerized to form a polymer network and liquid crystals are entrapped in the polymer network, which will be described in more detail later. The first liquid crystal device 120 including the liquid crystal layer with the PNLC structure is polarization dependent.

Thus, the optical pickup may further include a waveplate 19 for changing the polarization of light and a second liquid crystal device 125 having the same configuration as the first liquid crystal device 120, except for a liquid crystal director aligned orthogonal to that of the first liquid crystal device 120. In the embodiment shown in FIG. 2, the first liquid crystal device 120 is disposed between a polarization beam splitter 14 that is a light path changer and the waveplate 19. Similarly, the second liquid crystal device 125 is arranged adjacent to the first liquid crystal device 120 between the polarization beam splitter 14 and the waveplate 19. While FIG. 2 shows that the second liquid crystal device 125 is disposed between the first liquid crystal device 120 and the waveplate 19, such a second liquid crystal device 125 may also be located between the polarization beam splitter 14 and either the first liquid crystal device 120 or the photo-detector 40.

When the first and second liquid crystal devices 120 and 125 with liquid crystal directors aligned orthogonal to each other are disposed between the waveplate 19 and an objective lens 30 as shown in FIG. 2, a change in polarization of light traveling through them will now be described with reference to FIG. 3.

Figure 3:
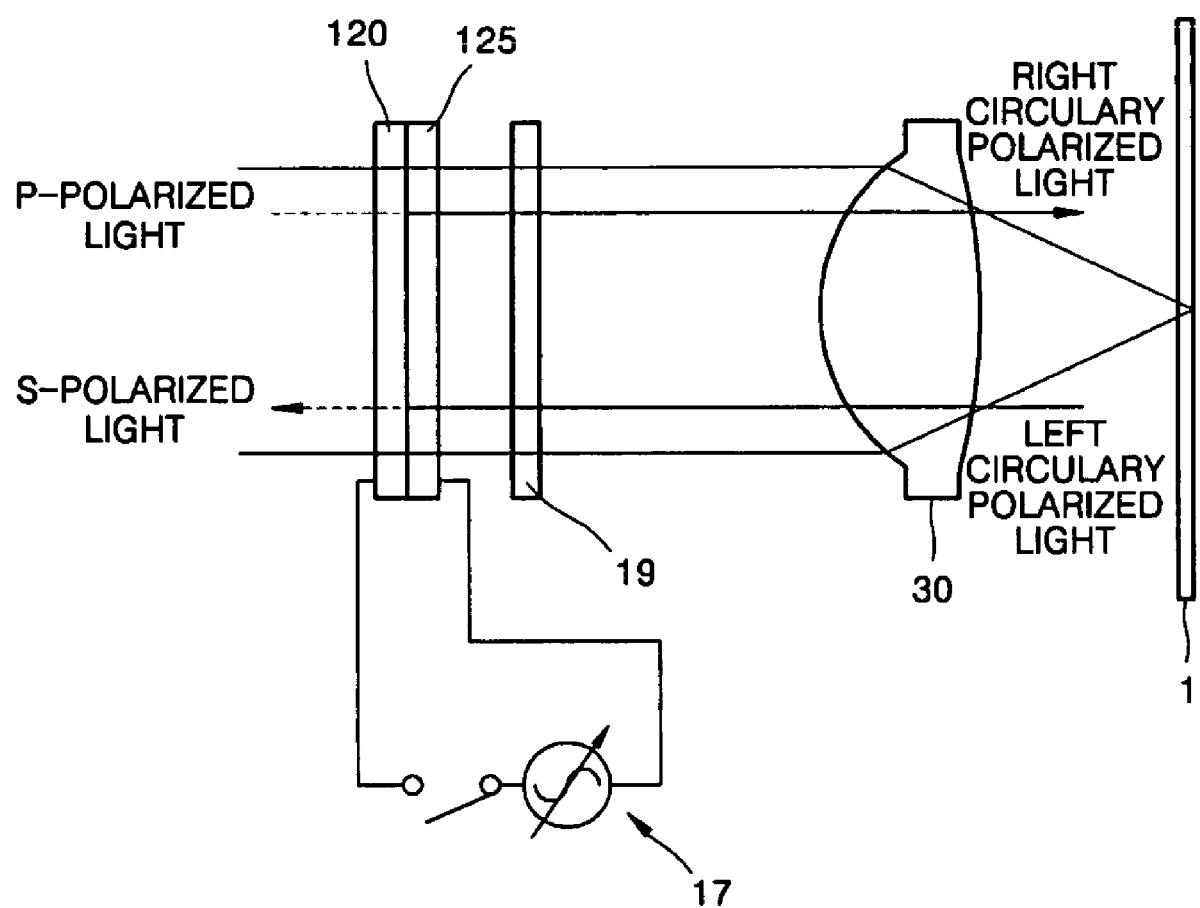
FIG. 3 shows a change in polarization of proceeding light in an optical pickup configuration shown in FIG. 2.

FIG. 3 shows a change in polarization of proceeding light in an optical pickup configuration shown in FIG. 2. Referring to FIG. 3, one linearly polarized beam, e.g., a p-polarized beam emitted from the light source 10 toward the polarization beam splitter 14 passes through a mirror surface of the polarization beam splitter 14, is changed into one circularly polarized beam, e.g., a right circularly polarized beam as it passes through the waveplate 19, and is incident on the optical disc 1. The one circularly polarized beam is changed into the other circularly polarized beam, e.g., a left circularly polarized beam as reflected by the optical disc 1. The other circularly polarized beam again passes through the waveplate 19 and it is changed into the other linearly polarized beam, e.g., an s-polarized beam. The other linearly polarized beam is reflected from the mirror surface of the polarization beam splitter 14 toward the photo-detector 40. Reference numeral 17 denotes a driving circuit for applying an electric field so that the first and second liquid crystal devices 120 and 125 have a phase difference distribution for compensating for aberration. An electric field is controlled to change the alignment of liquid crystal molecules and thereby the amount of variation in phase difference.

When the first and second liquid crystal devices 120 and 125 are located in front of the waveplate 19 as shown in FIG. 3, light emitted from the light source 10 toward the first and second liquid crystal devices 120 and 125 is the one linearly polarized light, e.g., p-polarized light while light that is reflected from the recording surface of the optical disc 1, passes through the waveplate 19, and is incident on the second and first liquid crystal devices 125 and 120 is the other linearly polarized beam, e.g., s-polarized beam.

In general, the birefringence of liquid crystal molecules can be changed only when a major axis direction of liquid crystal molecules aligned by rubbing is the same as the direction of polarization of light. The major axis direction of liquid crystal molecules corresponds to the direction of a liquid crystal director and is the same as the rubbing direction.

In the optical pickup according to the second embodiment shown in FIG. 2, the polarization state of light incident on the optical disc 1 is orthogonal to that of light reflected from the same. Thus, to correct aberration for light incident on the recording surface of the optical disc 1, the first liquid crystal device 120 is formed such that the direction of polarization of light emitted from the light source 10, i.e., p-polarization, is coincident with the major axis direction of liquid crystal (direction of liquid crystal director) before an electric field is applied thereto. Similarly, to correct aberration for light reflected from the recording surface of the optical disc 1 to the photo-detector 40, the second liquid crystal device 125 is formed such that the direction of polarization of light reflected from the recording surface of the optical disc 1, i.e., s-polarization, is coincident with the major axis direction of liquid crystal molecules before an electric field is applied thereto.

In this case, when an electric field is applied to the first and second liquid crystal devices 120 and 125, the light incident from the light source 10 has a phase difference distribution that is opposite to that of aberrations to be corrected as it passes through the first liquid crystal device 120 and undergoes no change in the phase difference distribution as it passes through the second liquid crystal device 125. Thus, the light for which aberration has been corrected is focused to a spot on the recording surface of the optical disc 1. Inverse aberration caused by the phase difference distribution generated by the first liquid crystal device 120 is present in light reflected from the recording surface of the optical disc 1 and is corrected as the light passes through the second liquid crystal device 125. The light passes through the first liquid crystal device 120 without any change in phase difference distribution.

As a result, the light received by the photo-detector 40 contains no aberration caused by phase difference and generated for correcting spherical aberration.

Meanwhile, as will be described later, in order to compensate for spherical aberration caused by a thickness difference in the optical disc 1, which is proportional to $r^4$, the first and second liquid crystal devices 120 and 125 are designed to have a phase difference distribution that is opposite to that of the spherical aberration proportional to $r^4$. Alternatively, the spherical aberration can be corrected by designing the first and second liquid crystal devices 120 and 125 to have a negative- or positive-type parabolic phase difference distribution and adjusting the divergence angle of light being incident on the objective lens 30.

In the optical pickup of the present invention as described in connection with FIG. 1 and FIG. 2, the liquid crystal device 20 (120 and 125) is designed to have a phase difference distribution that can compensate for at least one of spherical aberration caused by a thickness difference in the optical disc 1, spherical aberration introduced by a thickness difference in the optical disc 1 when the working distance of the objective lens 30 changes, coma aberration caused by the tilt of the optical disc 1, and coma aberration introduced by the tilt of the optical disc 1 when the objective lens 30 shifts.

Methods of manufacturing an aberration-compensating liquid crystal device will now be described more fully with reference to FIGS. 4A and 4B herein below.

Figure 4A:
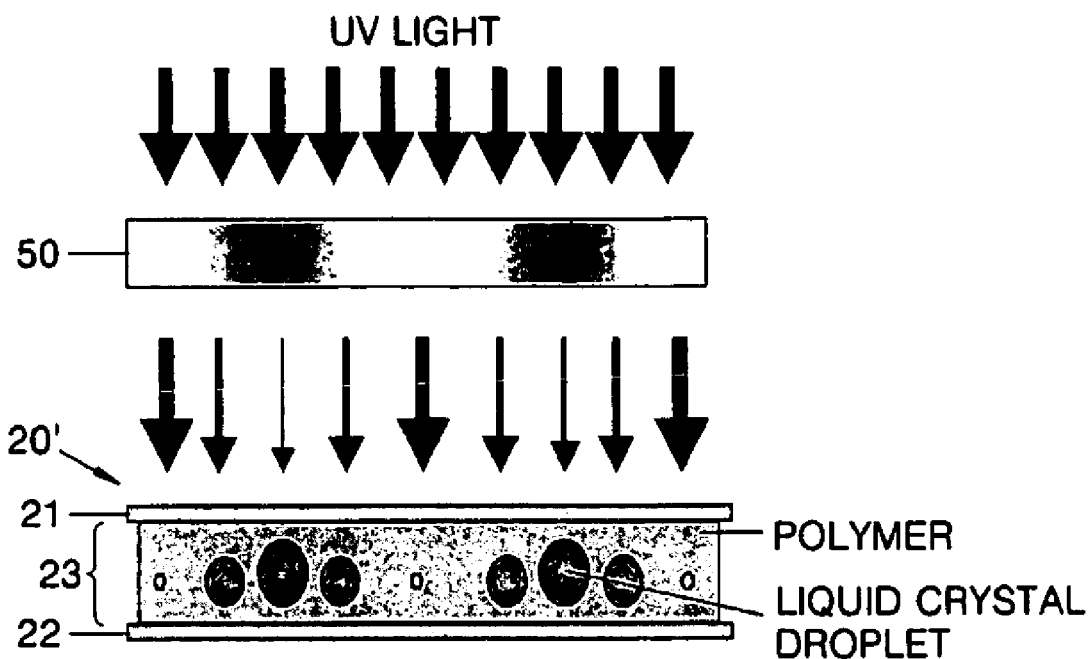
FIG. 4A is a diagram for explaining a method of manufacturing a nano polymer dispersed liquid crystal (PDLC) type liquid crystal device according to an embodiment of the present invention.

FIG. 4A is a diagram for explaining a method of manufacturing a nano PDLC type liquid crystal device 20' according to an embodiment of the present invention. The nano PDLC type liquid crystal device 20' may be used as the liquid crystal device 20 in the optical pickup as shown in FIG. 1.

Referring to FIG. 4A, a gray scale mask 50 having an absorption rate distribution corresponding to that of aberrations to be corrected is positioned on a liquid crystal cell containing a mixture of liquid crystals and monomers injected between a pair of transparent substrates 21 and 22 of a liquid crystal device 20'. The monomer is an ultraviolet (UV) curable monomer that can be polymerized by UV irradiation. The mixture contains an initiator to induce photopolymerization. Uniform indium tin oxide (ITO) layers (not shown) are respectively formed on the substrates 21 and 22. Alignment layers are also respectively formed and rubbed on the substrates 21 and 22. Two lead wires for applying an electric field runs from the liquid crystal cell and are connected to a driving circuit for the liquid crystal device 20' manufactured according to an embodiment of the present invention.

When the liquid crystal cell is irradiated by UV light, monomers are photopolymerized into polymer. This photopolymerization induces phase separation into a liquid crystal-existing region and a polymer-existing region, thereby forming a liquid crystal layer 23 between the substrates 21 and 22 with a phase difference distribution corresponding to that of aberrations to be corrected.

The rate of polymerization can be controlled by UV light intensity and irradiation time. As the UV light intensity increases, polymerization accelerates. When the UV light intensity is high, a high percentage of monomers are polymerized within a mixture, resulting in a large polymer-existing region. Conversely, when the UV light intensity is low, the polymer-existing region is small. The nano PDLC type liquid crystal device 20' and a PNLC type liquid crystal device which will be described later can be obtained by suitably adjusting the percentage of monomers to liquid crystal and UV light intensity.

The liquid crystal device 20' has the liquid crystal layer 23 on the liquid crystal cell. In accordance with an embodiment of the present embodiment, the liquid crystal layer 23 has a nano PDLC structure in which the size and density distribution of liquid crystal droplets is coincident with a phase difference distribution corresponding to that of aberrations to be corrected. The liquid crystal layer 23 contains liquid crystal droplets of nanometer unit.

To obtain the liquid crystal layer 23 having a nano PDLC structure with liquid crystal droplets of diameter of several ten to several hundred nanometers, UV light intensity increases while liquid crystal concentration decreases compared to a manufacturing process for the existing PDLC.

Here, as the UV light intensity increases, polymerization accelerates so the size and density of liquid crystal droplets decrease. Conversely, as the UV light intensity decreases, the amount of polymers formed decreases so the size and density of liquid crystal droplets increase.

Since a phase change (phase delay effect) introduced upon application of a predetermined voltage to the liquid crystal device 20' is represented by a variation of refractive index multiplied by a thickness, a larger phase change can be induced as the size and density of liquid crystal droplets increase.

Figure 5A:
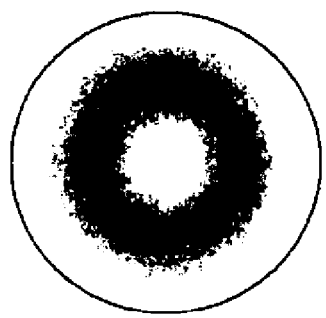
FIG. 5A shows an example gray scale mask having an absorption rate distribution that is coincident with that of spherical aberration according to an embodiment of the present invention.

Thus, by designing the gray scale mask 50 disposed on the entire surface of the liquid crystal cell containing the mixture of liquid crystal and monomers as shown in FIG. 4A to have a absorption rate distribution that is coincident with the predicted distribution of aberrations as shown in FIG. 5A, the size and density distribution of liquid crystal droplets embedded in the liquid crystal device 20' can be made coincident with that of aberrations to be corrected.

FIG. 5A shows an example of a gray scale mask having an absorption rate distribution that is coincident with that of spherical aberration. By applying uniform electric field to the liquid crystal device 20' thus manufactured, a phase distributed across the regions of the liquid crystal device 20' can be made equal to the inverse of aberration to be corrected.

Figure 5B:
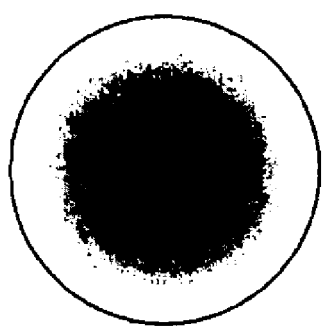
FIG. 5B shows an example gray scale mask having a positive-type two-dimensional (2-D) parabolic absorption rate distribution according to an embodiment of the present invention.
Figure 5C:
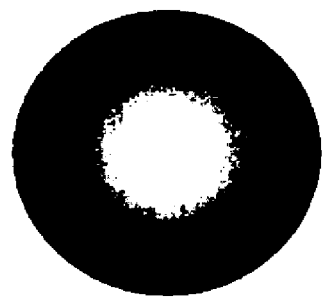
FIG. 5C shows an example gray scale mask having a negative-type 2-D parabolic absorption rate distribution according to an embodiment of the present invention.

Thus, as described above with reference to FIG. 1, when the liquid crystal device 20' is used in an optical pickup and an electric field is applied to the liquid crystal device 20', effective aberration correction can be achieved by adjusting only the magnitude of the electric field because the liquid crystal device 20' has a phase difference distribution proportional to the electric field, which is opposite to that of aberrations to be corrected. When the gray scale mask 50 has a positive- or negative-type two-dimensional (2-D) parabolic absorption rate distribution as shown in FIG. 5B or 5C, a liquid crystal device using configuration adjusting the divergence angle of an incident beam or reflected beam can be obtained.

The liquid crystal device 20' having the nano PDLC structure basically produces a phase difference independently of the polarization of incident light upon application of electric field.

Therefore, the liquid crystal device 20' designed such that the liquid crystal size distribution of the liquid crystal droplets is coincident with that of aberrations to be corrected using the gray scale mask 50 with an absorption rate distribution that is coincident with that of aberration is able to correct aberration regardless of the polarization of incident light.

While two typical homogenous liquid crystal devices are needed to correct aberration for incident light and reflected light whose polarization states are orthogonal to each other, a single liquid crystal device 20' of the present invention, as shown, for example, in FIG. 1 and FIG. 4A, can be used to correct aberration for both incident and reflected beams. This can significantly reduce the manufacturing costs, weight, and size of an optical pickup.

While a conventional homogenous liquid crystal device has a response time of several milliseconds to the application of electric field, the liquid crystal device 20' with nanometer-sized liquid crystal droplets of the present invention requires a response time of several hundred microseconds to the application or removal of electric field, thereby allowing efficient driving of an optical pickup.

Another advantage of the liquid crystal device 20' designed such that the distribution of liquid crystal droplets is coincident with the predicted distribution of spherical aberrations is to significantly simplify the manufacturing process and reduce the manufacturing costs by eliminating the need for ITO electrode patterning and deposition of metal electrode thereon required for a conventional aberration-compensating liquid crystal device. The liquid crystal device 20' of the present invention also prevents reduction in light transmittance and correction effect due to formation of patterned ITO electrodes and addition of metal electrodes. Furthermore, the liquid crystal device 20' of the present invention requires only two lead wires for driving, thereby significantly simplifying driving and interconnection.

Furthermore, when the gray scale mask 50 has a positive-or negative-type 2-D parabolic absorption rate distribution as shown in FIG. 5B or FIG. 5C, the nano PDLC type liquid crystal device 20' using configuration adjusting the divergence angle of an incident beam or reflected beam can be fabricated with a simple process. The nano PDLC type liquid crystal device 20' has a high response rate and is polarization independent to correct aberration for both incident and reflected beams.

Figure 4B:
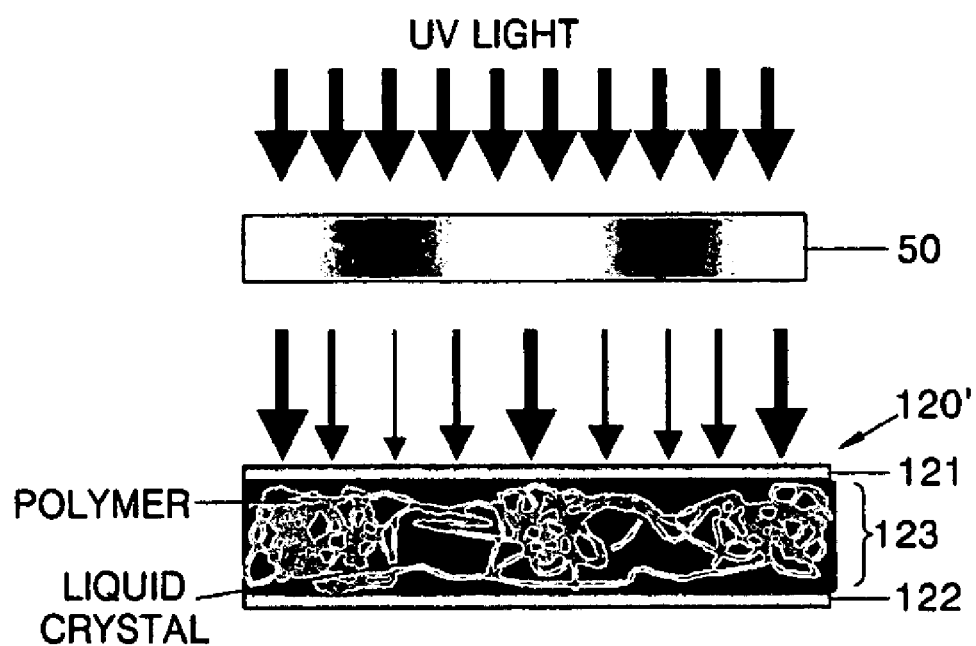
FIG. 4B is a diagram for explaining a method of manufacturing a nano polymer network LC (PNLC) type liquid crystal device according to another embodiment of the present invention.

FIG. 4B is a diagram for explaining a method of manufacturing a nano PNLC type liquid crystal device 120' according to an embodiment of the present invention. The PNLC type liquid crystal device 120' may be used as the liquid crystal devices 120 and 125 in the optical pickup as shown in FIG. 2.

Referring to FIG. 4B, a gray scale mask 50 having an absorption rate distribution corresponding to that of aberrations to be corrected is positioned on a liquid crystal cell containing a mixture of liquid crystal and monomers injected between a pair of transparent substrates 121 and 122 of a nano PNLC type liquid crystal device 120'. The monomer is an ultraviolet (UV) curable monomer that can be polymerized by UV irradiation. The mixture contains an initiator to induce photopolymerization. Uniform indium tin oxide (ITO) layers (not shown) are respectively formed on the substrates 121 and 122. Alignment layers are also respectively formed and rubbed on the substrates 121 and 122. Two lead wires for applying an electric field runs from the liquid crystal cell and are connected to a driving circuit (not shown) for the liquid crystal device 120' manufactured according to the present embodiment.

When the liquid crystal cell is irradiated by UV light, monomers are photopolymerized into polymer. This photopolymerization induces phase separation into liquid crystal-existing region and polymer-existing region, thereby obtaining a liquid crystal layer 123 with a phase difference distribution that is opposite to that of aberrations to be corrected.

The liquid crystal layer 123 has a polymer network liquid crystal (PNLC) structure in which monomers are polymerized to form a polymer network and liquid crystals are entrapped in the polymer network.

To form the PNLC structure, the percentage of liquid crystal in the mixture is higher than that of monomers and UV light intensity is low.

The density of polymer network is proportional to the intensity of UV light. A polymer network is dense under high-intensity UV irradiation so a low percentage of liquid crystals exist while a polymer network is loose under low-intensity UV irradiation so the a high percentage of liquid crystals exist.

When the nano PNLC type liquid crystal device 120' uses the gray scale mask 50 with an absorption rate distribution that is coincident with that of spherical aberration as shown in FIG. 5A, the liquid crystal layer 123 has a liquid crystal density distribution that is coincident with that of spherical aberration. Thus, it is possible to correct spherical aberration by creating a phase difference of an opposite sign to the spherical aberration upon application of an electric field. Alternatively, when the gray scale mask 50 has a positive- or negative-type 2-D parabolic absorption rate distribution as shown in FIG. 5B or 5C, the nano PNLC type liquid crystal device 120' using configuration adjusting the divergence angle of an incident or reflected beam can be manufactured.

A single nano PDLC type liquid crystal device previously described can be used to correct aberration for both incident and reflected beams whose polarization states are orthogonal to each other because of its polarization independence. However, the PDLC type liquid crystal device requires a high driving voltage.

By making the percentage of liquid crystals in a mixture higher than that of monomers, a PNLC structure can be formed in which the monomers are polymerized to form polymer networks and liquid crystals are entrapped in the polymer networks.

The PNLC type liquid crystal device having a significantly high percentage of liquid crystals can be driven at a very low voltage, thereby overcoming the drawback of the nano PDLC type liquid crystal device requiring a high driving voltage. However, being polarization dependent, a separate PNLC type liquid crystal device is needed to correct aberration for incident and reflected beams.

However, the PNLC type liquid crystal device also satisfies the unique advantages of the present invention, including to simplify manufacturing process and driving. That is, the PNLC type liquid crystal device is designed such that the distribution of liquid crystal droplets is coincident with the predicted distribution of spherical aberrations, thereby significantly simplifying the manufacturing process while reducing the manufacturing costs by eliminating the need for ITO electrode patterning and deposition of metal electrode thereon required for a conventional aberration-compensating liquid crystal device. The PNLC type liquid crystal device also prevents reduction in light transmittance and correction effect due to formation of patterned ITO electrodes and addition of metal electrodes. Furthermore, the PNLC type liquid crystal device requires only two lead wires for driving, thereby permitting simple driving and interconnection.

Also, when the gray scale mask 50 has a positive-or negative-type 2-D parabolic absorption rate distribution as shown in FIG. 5B or FIG. 5C, the nano PNLC type liquid crystal device using configuration for adjusting the divergence angle of an incident or reflected beam can be fabricated with a simple process, thereby permitting low voltage driving.

The nano PDLC type liquid crystal device 20' can be manufactured using 30 to 40 wt. % of E7 (no=1.511, ne=1.7400, $\Delta n=0.23$) available from Merck as liquid crystal, 60 to 70 wt. % of NOA 81 (n=1.56, UV curable adhesive, Norland product) as monomer (prepolymer), mixture containing about 1 wt. % benzophenone as photo initiator, and UV light with an intensity of 500 to 700 mW/cm$^2$.

The PNLC type liquid crystal device 120' can be manufactured using 90 wt. % of E44 available from Merck as liquid crystal, mixture of 6 wt. % bisphenol-A-dimethacrylate (M1) and 4 wt. % RM-82 as monomer (prepolymer), mixture containing a small amount of photo initiator, and UV light with an intensity of about 45 mW/cm$^2$.

Either nano PDLC or PNLC type liquid crystal device can be obtained by suitably changing the percentage of liquid crystals to monomers based on the above compositions in the mixtures and intensity and irradiation time of UV light. In addition, various changes may also be made to the compositions in the mixtures and intensity of UV light.

While the aberration-compensating liquid crystal device of the present invention has been described to correct spherical aberration, it may have various other configurations to correct various aberrations as illustrated in FIGS. 6A through 10B.

Figure 6A:
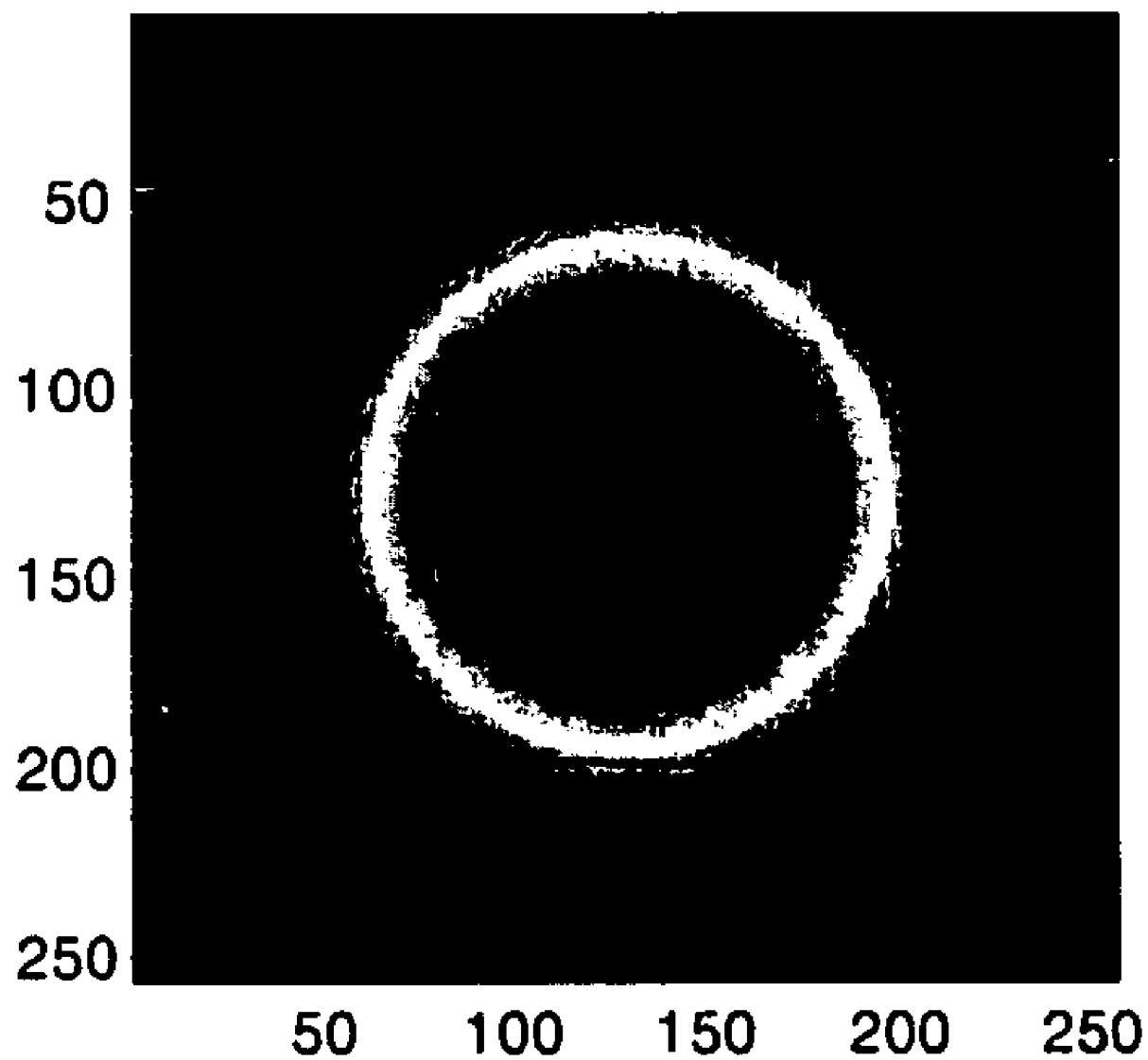
FIG. 6A shows an example two-dimensional (2-D) distribution of spherical aberrations introduced due to a thickness difference in an optical disc.
Figure 6B:
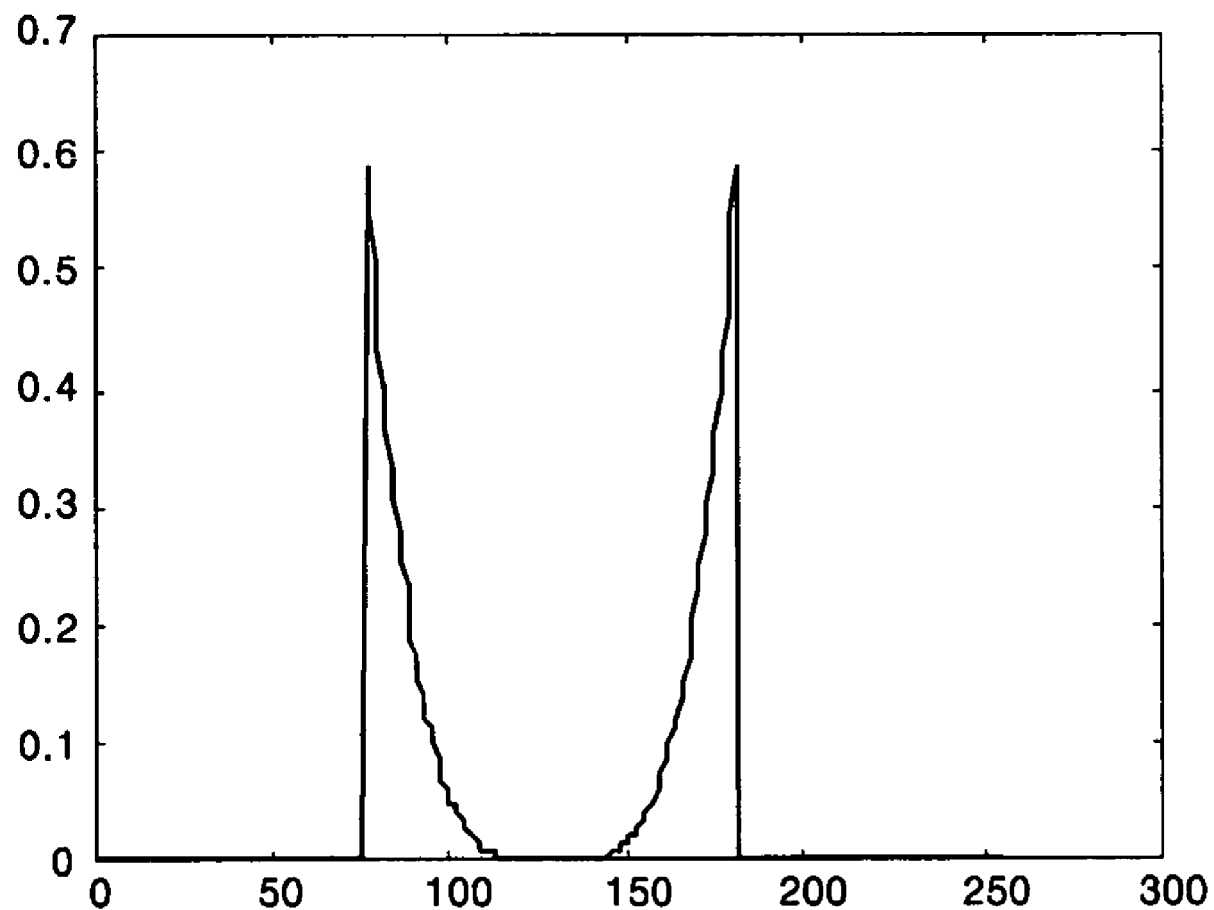
FIG. 6B shows an example one-dimensional (1-D) distribution of the spherical aberrations shown in FIG. 6A.

FIG. 6A illustrates the 2-D distribution of spherical aberrations introduced due to a thickness difference in the optical disc 1, and FIG. 6B illustrates the one-dimensional (1-D) distribution of the spherical aberrations shown in FIG. 6A. When coordinates relative to an optical axis in the radial direction are denoted by r, the spherical aberration caused by the thickness difference in the optical disc 1 is proportional to $r^4$ as illustrated in FIGS. 6A and 6B. Thus, when the liquid crystal layer 23 (123) is formed using the gray scale mask 50 with an absorption rate distribution that is proportional to $r^4$, the liquid crystal device 20 (120 or 125) representing a phase difference distribution that is opposite to that of the spherical aberrations may be formed.

Figure 7A:
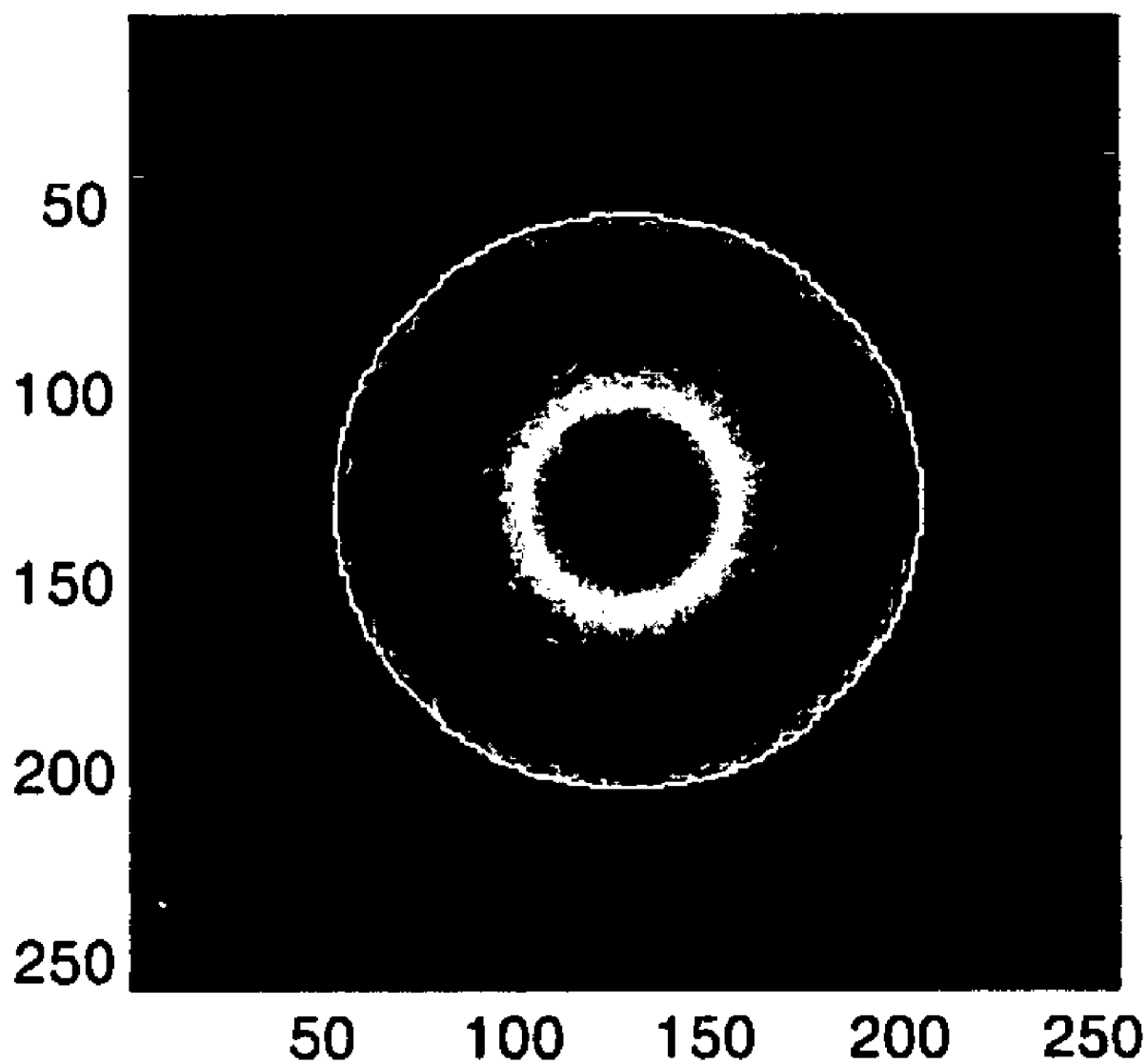
FIG. 7A shows an example two-dimensional (2-D) distribution of spherical aberrations introduced due to a thickness difference in an optical disc when the working distance of an objective lens changes.
Figure 7B:
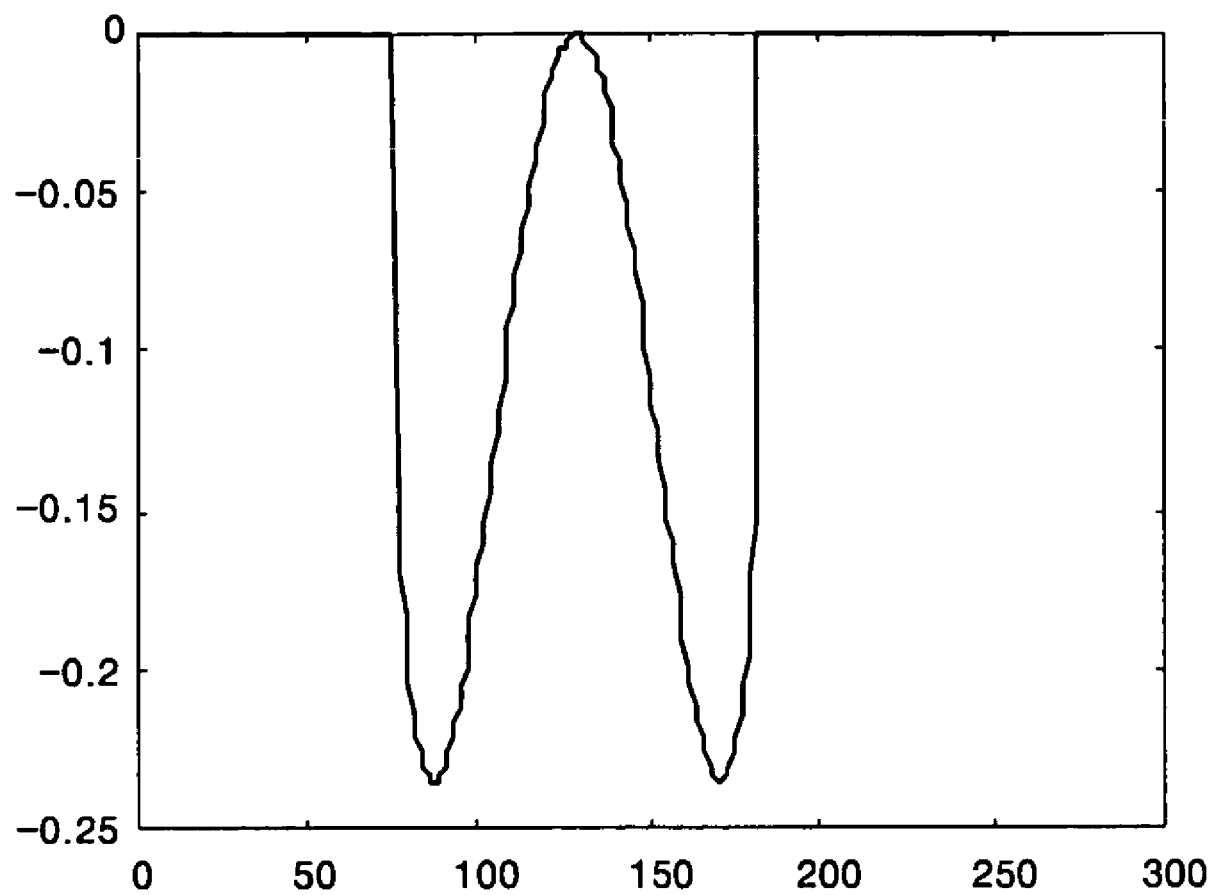
FIG. 7B shows an example one-dimensional (1-D) distribution of the spherical aberrations shown in FIG. 7A.

FIG. 7A illustrates the 2-D distribution of spherical aberrations introduced due to a thickness difference in the optical disc 1 when the working distance of the objective lens 30 changes and FIG. 7B illustrates the 1-D distribution of the spherical aberrations shown in FIG. 7A. When coordinates relative to an optical axis in the radial direction are denoted by r, spherical aberration caused by a thickness difference in the optical disc 1 is reduced to $r^4 - r^2$ when the objective lens 30 is moved up or down in a focusing direction to change the working distance. $r^2$ is the term derived from upward or downward movement of the objective lens 30. Thus, when the liquid crystal layer 23 (123) is formed using the gray scale mask 50 with an absorption rate distribution that is proportional to $r^4 - r^2$, the liquid crystal device 20 (120 or 125) exhibiting a phase difference distribution that is opposite to that of the spherical aberrations while the working distance of the objective lens 30 is changing may be formed.

Figure 8A:
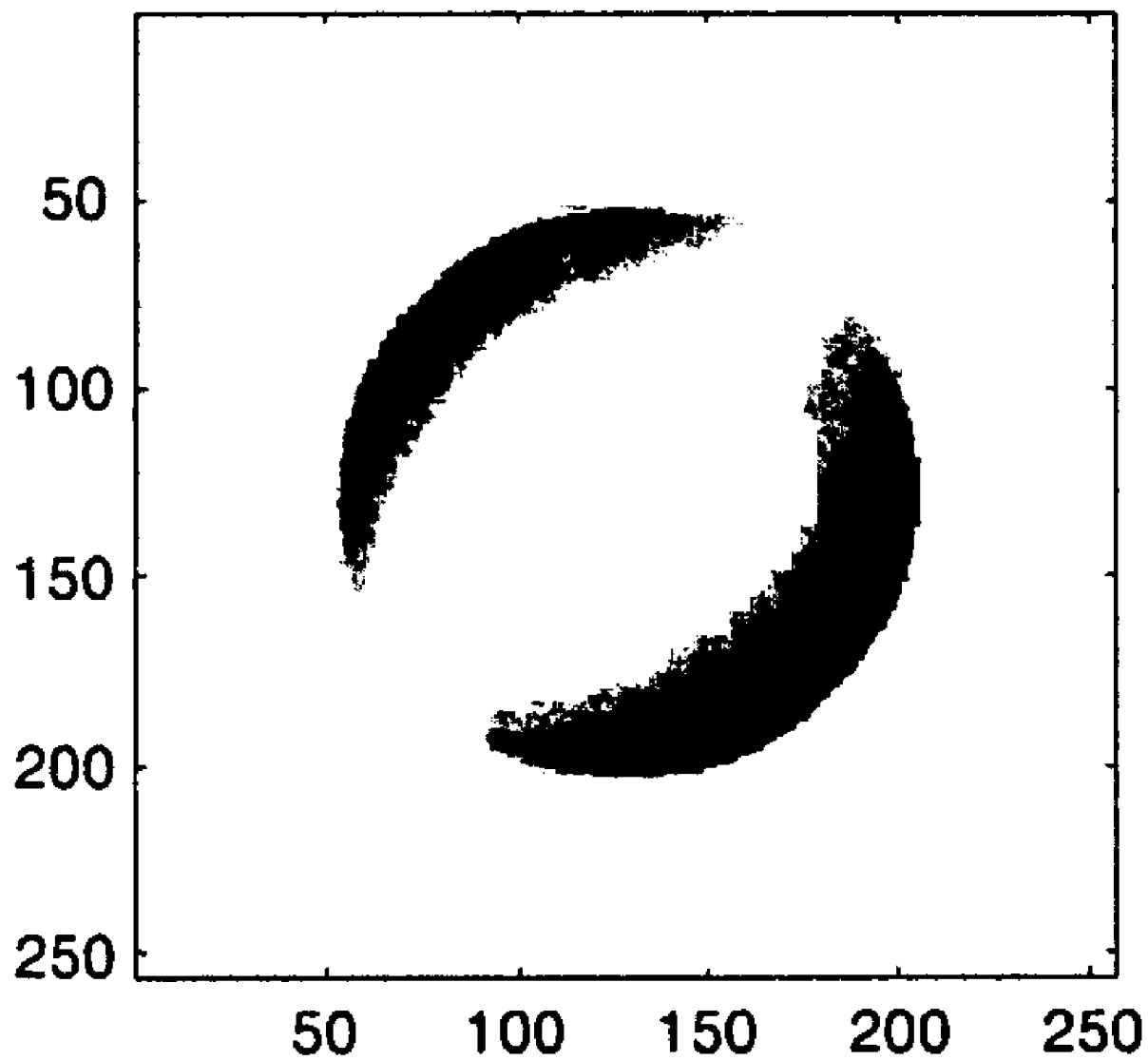
FIG. 8A shows an example two-dimensional (2-D) distribution of coma aberrations caused by the tilt of an optical disc.
Figure 8B:
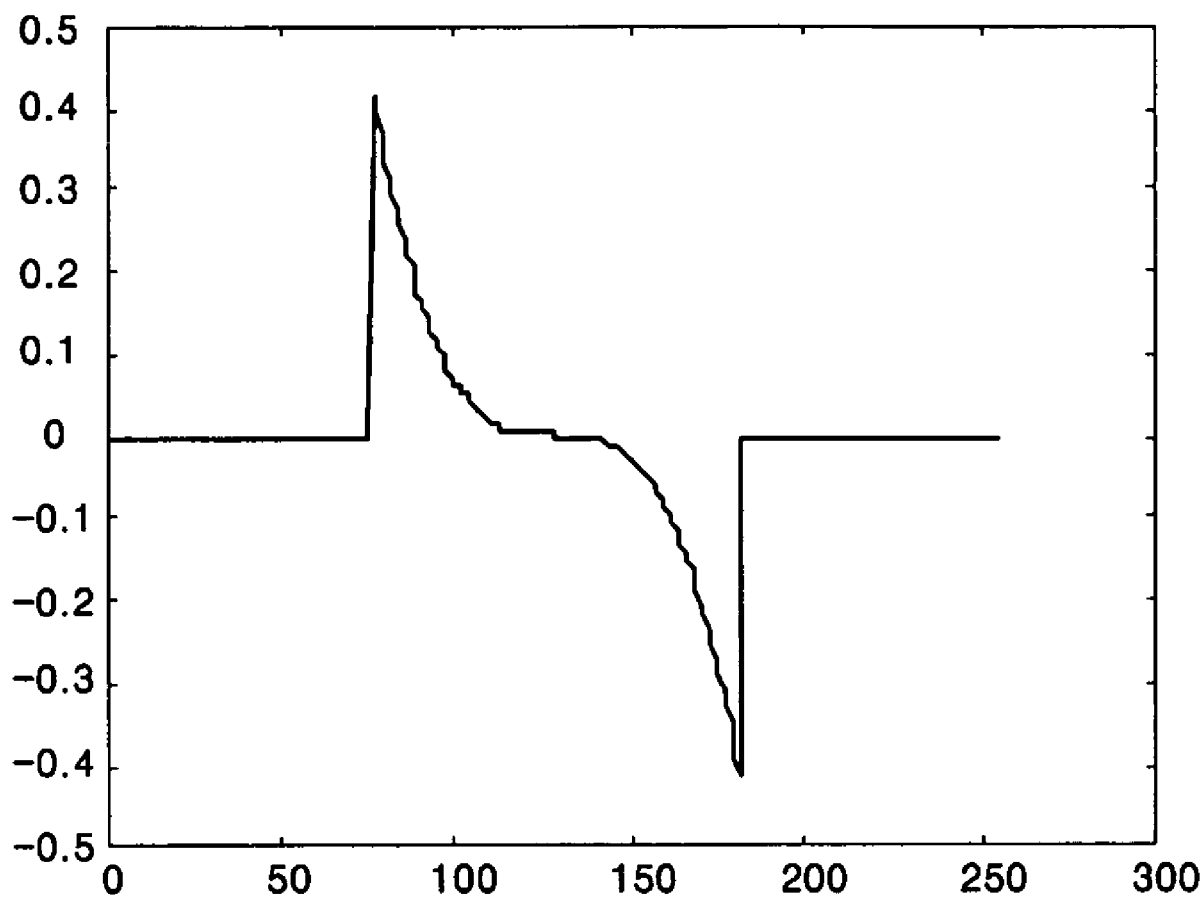
FIG. 8B shows an example one-dimensional (1-D) distribution of the coma aberrations shown in FIG. 8A.

FIG. 8A illustrates the 2-D distribution of coma aberrations caused by the tilt of the optical disc 1, and FIG. 8B illustrates the 1-D distribution of the coma aberrations shown in FIG. 8A. The coma aberration is proportional to $r^3$. The coma aberration is $r^3 \times \cos \phi$ ($\phi$ is an azimuthal angle). When the liquid crystal layer 23 shown in FIG. 4A (or 123 shown in FIG. 4B), is formed using the gray scale mask 50 with an absorption rate distribution that is proportional to $r^3 \times \cos \phi$, the liquid crystal device 20 shown in FIG. 1, (120 or 125 shown in FIG. 2) exhibiting a phase difference distribution that is opposite to that of the coma aberrations may be formed.

Figure 9A:
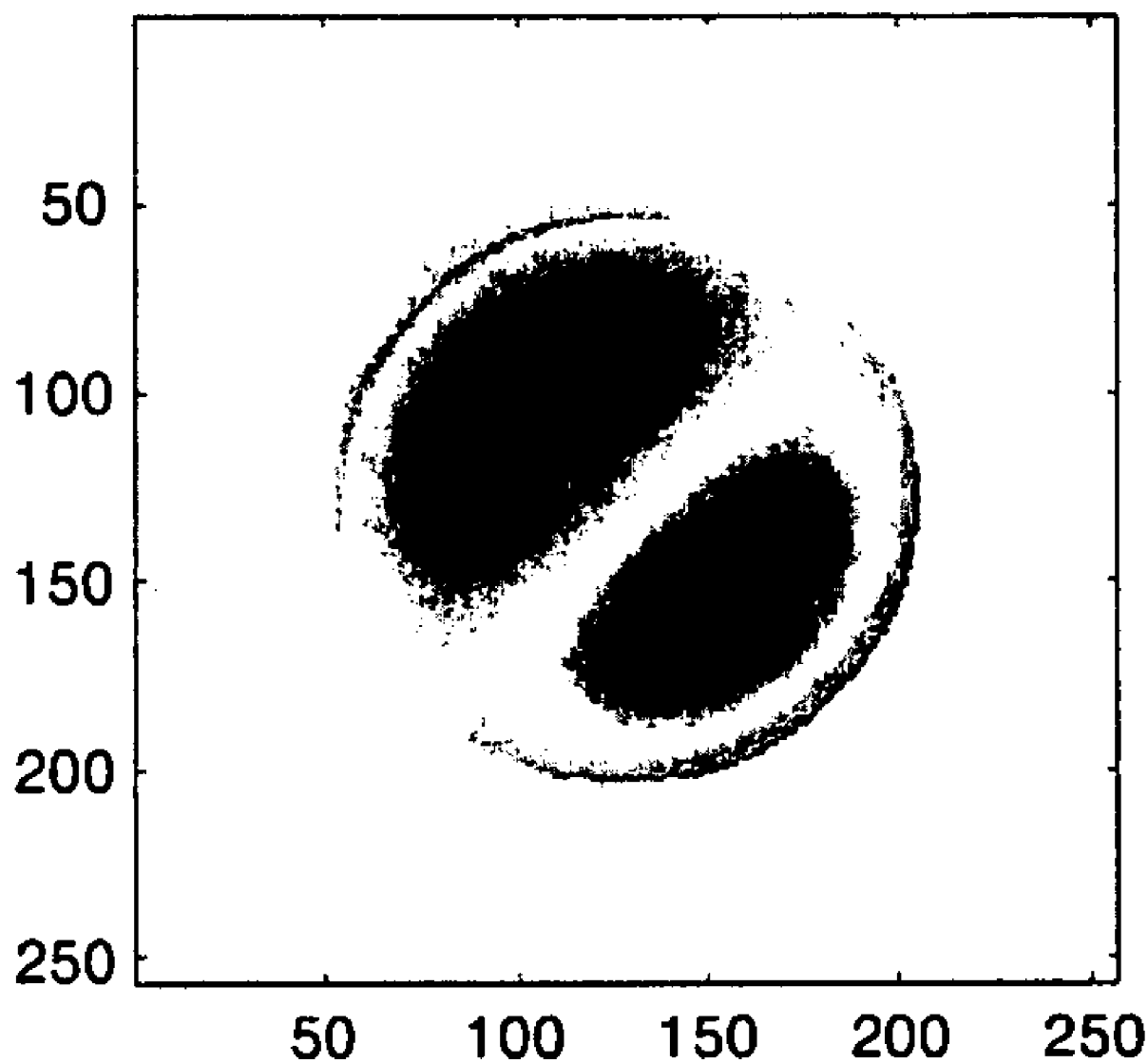
FIG. 9A shows an example two-dimensional (2-D) distribution of coma aberrations caused by the tilt of an optical disc when an objective lens shifts.
Figure 9B:
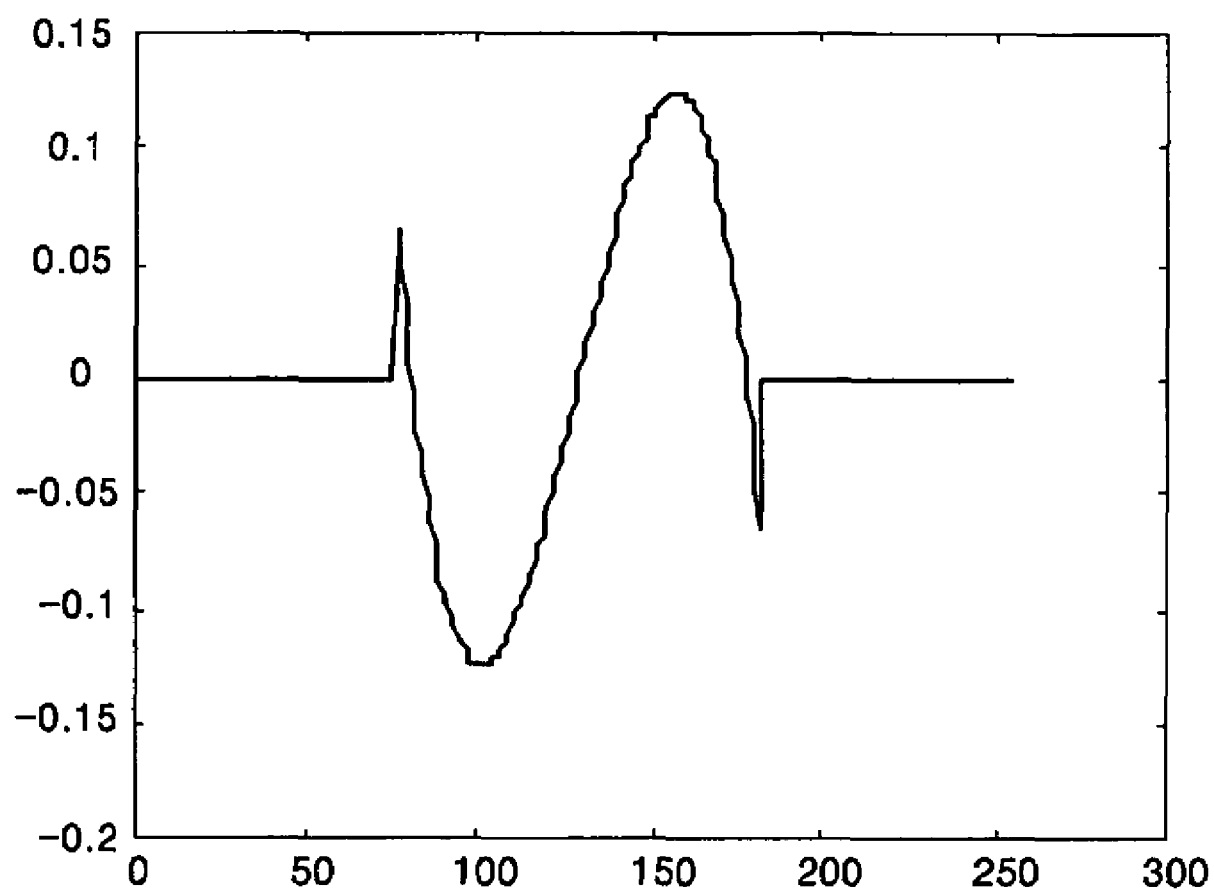
FIG. 9B shows an example one-dimensional (1-D) distribution of the coma aberrations shown in FIG. 9A.

FIG. 9A illustrates the 2-D distribution of coma aberrations caused by the tilt of the optical disc 1 when the objective lens 30 shifts, and FIG. 9B illustrates the 1-D distribution of the coma aberrations shown in FIG. 9A. The coma aberration resulting from the tilt of the optical disc 1 can be reduced to $r^3 - (2/3) \times r$ due to an objective lens shift. $(2/3) \times r$ is the term derived from the objective lens shift. When the liquid crystal layer 23 (123) is formed using the gray scale mask 50 with an absorption rate distribution that is proportional to $(r^3 - (2/3) \times r) \times \cos \phi$, the liquid crystal device 20 (120 or 125) exhibiting a phase difference distribution that is opposite to that of the coma aberrations caused by the tilt of the optical disc 1 when the objective lens 30 shifts may be formed.

Figure 10A:
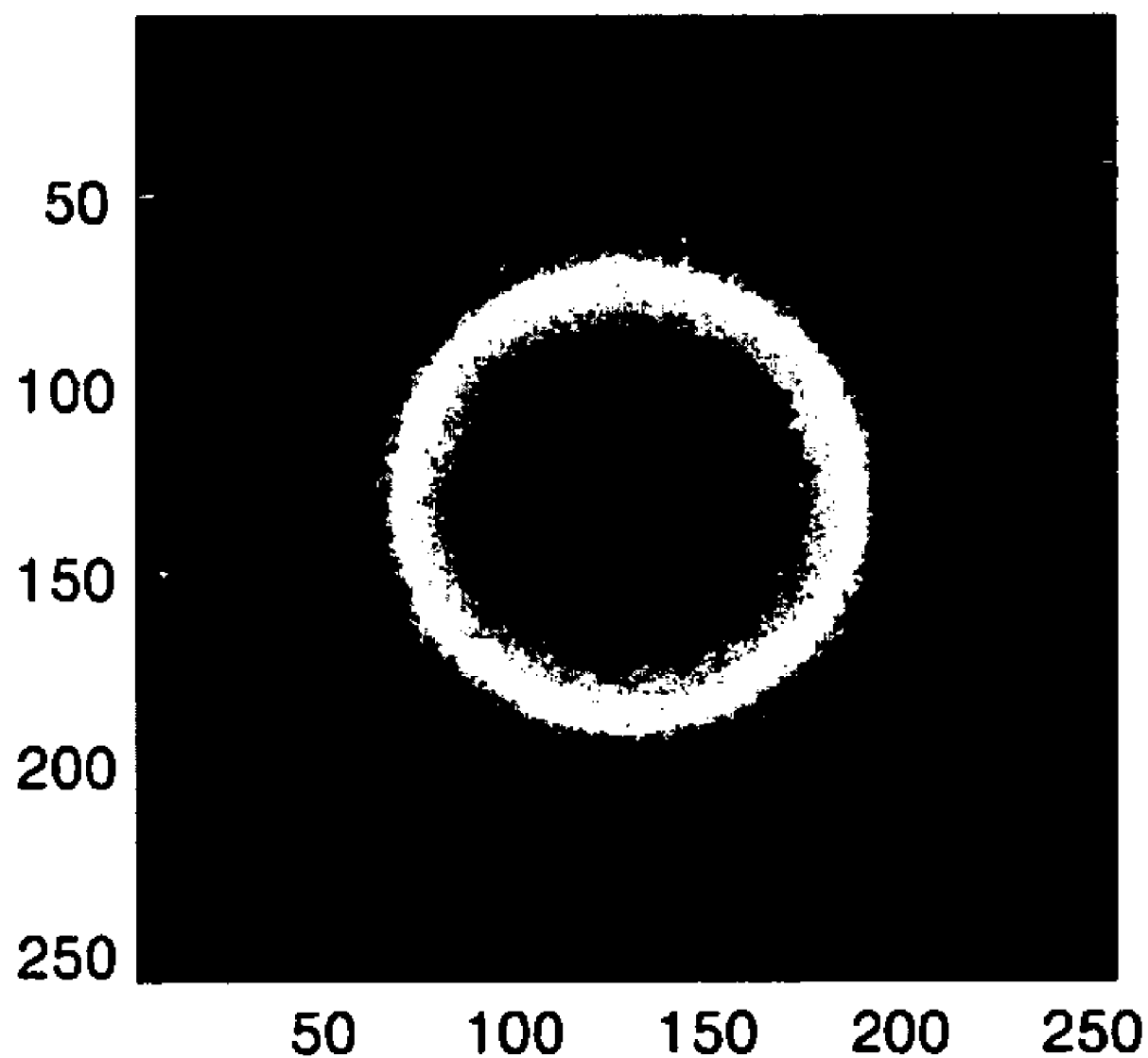
FIG. 10A shows an example two-dimensional (2-D) parabolic distribution.
Figure 10B:
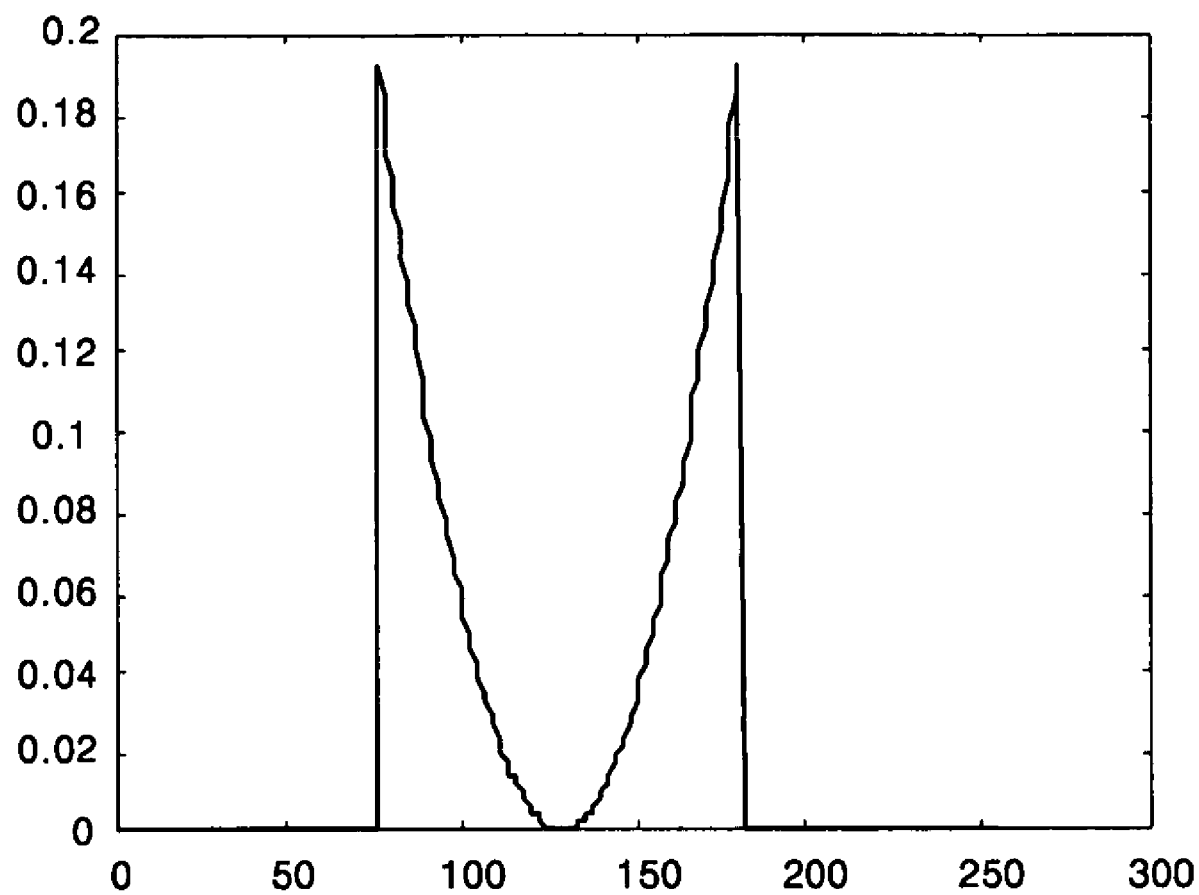
FIG. 10B shows an example one-dimensional (1-D) parabolic distribution.

It is well-known that spherical aberration caused by a thickness difference in the optical disc 1 can be corrected when a diverging or converging beam that is proportional to $r^2$ is incident on the objective lens 30. FIG. 10A illustrates the 2-D parabolic distribution of spherical aberrations, and FIG. 10B illustrates the 1-D distribution of the parabolic distribution shown in FIG. 10A. As illustrated in FIGS. 10A and 10B, spherical aberration caused by the thickness difference can be corrected when a diverging or converging beam that is proportional to $r^2$ is incident on the objective lens 30. Thus, when the liquid crystal layer 23 shown in FIG. 4A (123 shown in FIG. 4B) is formed using the gray scale mask 50 with an absorption rate distribution that is proportional to $r^2$, the liquid crystal device 20 shown in FIG. 1 (120 or 125 shown in FIG. 2) may exhibit a phase difference distribution that is opposite to that of the spherical aberrations.

While the liquid crystal device can correct either spherical or coma aberration as described with reference to FIGS. 6A through 10B, liquid crystal device compensating for two or more types of aberrations may be manufactured. For example, when the liquid crystal layer 23 (123) is formed using the gray scale mask 50 with an absorption rate distribution corresponding to the sum of the 2-D distributions of spherical and coma aberrations shown in FIGS. 6A and 8A, respectively, the liquid crystal device 20 (120 or 125) may compensate for both spherical aberration resulting from an optical disc thickness difference and coma aberration resulting from an optical disc tilt.

The liquid crystal device 20 (120 or 125) according to example embodiments of the present invention may be fabricated using the gray scale mask 50 with an absorption rate distribution corresponding to that of at least one of spherical aberration caused by a thickness difference in the optical disc 1, spherical aberration introduced by a thickness difference in the optical disc 1 when the working distance of the objective lens 30 changes, coma aberration caused by the tilt of the optical disc 1, and coma aberration introduced by the tilt of the optical disc 1 when the objective lens 30 shifts. It may also be fabricated using the gray scale mask 50 with a positive- or negative-type 2-D parabolic absorption rate distribution.

Furthermore, the liquid crystal device 20 (120 or 125) fabricated by using the above various gray scale masks may have a phase difference distribution that is opposite to that of at least one of spherical aberrations caused by a thickness difference in the optical disc 1, spherical aberrations introduced by a thickness difference in the optical disc 1 when the working distance of the objective lens 30 changes, coma aberrations caused by the tilt of the optical disc 1, and coma aberrations introduced by the tilt of the optical disc 1 when the objective lens 30 shifts in order to correct the aberrations. Furthermore, when the liquid crystal layer 23 (123) is formed using the gray scale mask 50 with a positive- or negative-type 2-D parabolic absorption rate distribution, the liquid crystal device 20 (120 or 125) has a 2-D parabolic phase difference distribution that is the inverse of the absorption rate distribution of the gray scale mask 50. Thus, spherical aberration resulting from a thickness difference in the optical disc 1 can be corrected when the liquid crystal device 20 (120 or 125) has the 2-D parabolic phase difference distribution and a diverging or converging beam is incident on the objective lens 30.

A liquid crystal device capable of compensating for a desired aberration may be obtained when a mixture consisting of liquid crystals, UV curable monomers, and initiator inducing photopolymerization is injected into an empty liquid crystal cell and the liquid crystal cell is irradiated by UV light through a gray scale mask having an absorption rate distribution that is coincident with that of aberrations to be corrected or having a positive- or negative-type 2-D parabolic phase difference distribution. An optical pickup using the liquid crystal device thus manufactured can correct at least one of spherical aberration resulting from an optical disc thickness difference and coma aberrations resulting from an optical disc tilt.

Figure 11:
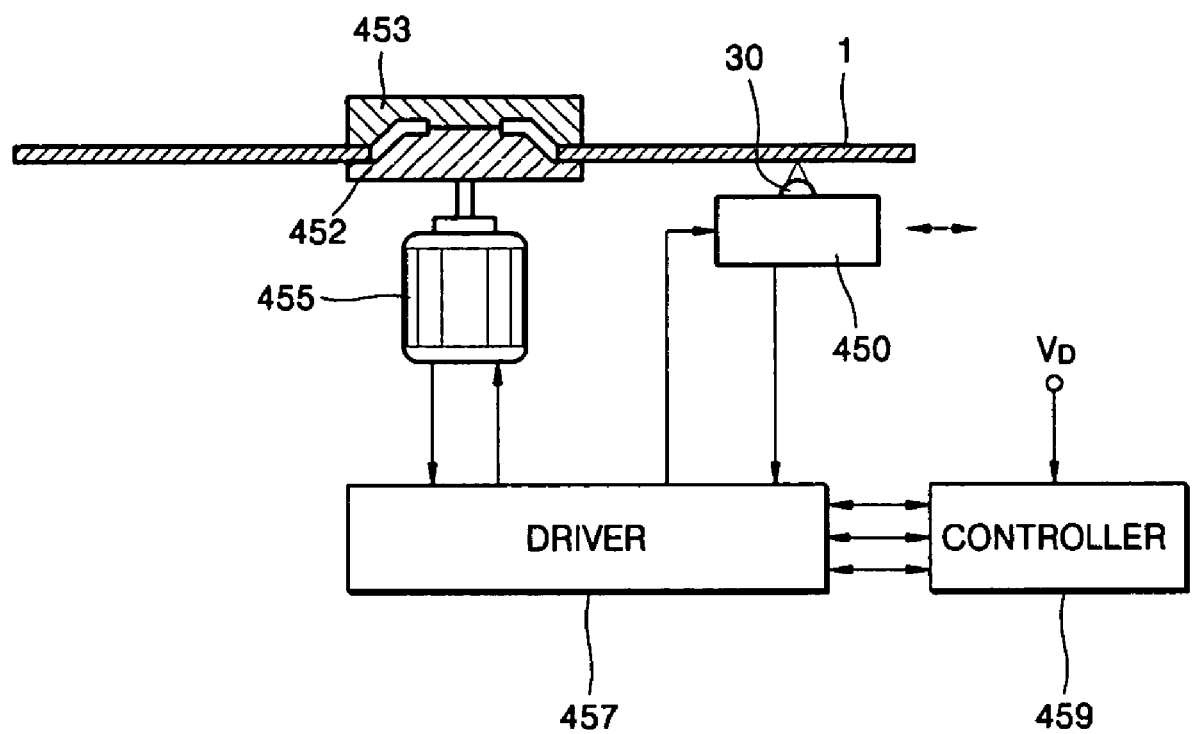
FIG. 11 schematically shows the construction of an optical recording and/or reproducing apparatus employing an optical pickup according to an embodiment of the present invention.

FIG. 11 schematically shows the construction of an optical recording and/or reproducing apparatus employing an optical pickup according to an embodiment of the present invention Referring to FIG. 11, the optical recording and/or reproducing apparatus includes a spindle motor 455 rotating an optical disc 1 that is an optical information storage medium, an optical pickup 450 that is installed movably along a radial direction of the optical disc 1 and reproduces and/or records information from and/or on the optical disc 1, a driver 457 driving the spindle motor 455 and the optical pickup 450, and a controller 459 controlling focusing and tracking servos of the optical pickup 450. Here, reference numerals 452 and 453 denote a turntable and a clamp for chucking the optical disc 1, respectively.

The optical pickup 450 has the optical system configuration shown in FIG. 1 or FIG. 2.

A beam reflected from the optical disc 1 is detected by a photo-detector mounted in the optical pickup 450 and photo-electrically converted into an electrical signal that is then input to the controller 459 through the driver 457. The driver 457 controls the rotating speed of the spindle motor 455, amplifies the input signal, and drives the optical pickup 450. The controller 459 sends focus servo and tracking servo commands, which has been adjusted based on the signal received from the driver 457, back to the driver 457 so that the optical pickup can perform focusing and tracking operation.

In order to correct aberrations, the optical recording and/or reproducing apparatus employing the optical pickup 450 according to an embodiment of the present invention generates a phase difference distribution that is opposite to that of the aberrations resulting from a thickness difference and/or tilt of the optical disc 1 upon application of a voltage to the liquid crystal device 20 shown in FIG.1 (120 or 125 shown in FIG. 2).

As described from the foregoing, the present invention advantageously provides an aberration-compensating liquid crystal device that can be fabricated with a simple manufacturing process by eliminating the need for electrode patterning and deposition of metal electrode and is able to prevent reduction in correction effect and light transmittance while permitting simple interconnection and driving.

The nano PDLC type liquid crystal device of the present invention is polarization independent to correct aberration for both incident and reflected beams.

The nano PNLC type liquid crystal device of the present invention achieves a high response rate.

While the present invention has been particularly shown and described with reference to exemplary embodiments thereof, it will be understood by those of ordinary skill in the art that various changes in form and details may be made therein without departing from the spirit and scope of the present invention. For example, any other arrangement of elements in an optical pickup may be utilized, as long as a liquid crystal device is utilized in the manner described in connection with FIG. 1, FIG. 2, FIG. 3, FIGS. 4A-4B, and FIG. 11. In addition, components of an optical recording and/or reproducing apparatus can also be configured differently as shown in FIG. 11. Accordingly, it is intended, therefore, that the present invention not be limited to the various example embodiments disclosed, but that the present invention includes all embodiments falling within the scope of the appended claims.

What is claimed is:

1. A method of manufacturing an aberration-compensating liquid crystal device, comprising:

positioning a gray scale mask having an absorption rate distribution corresponding to that of aberrations to be corrected on a liquid crystal cell containing a mixture of liquid crystals and monomers injected between a pair of transparent substrates; and irradiating the liquid crystal cell on which the gray scale mask has been positioned with UV light so that the monomers undergo photopolymerization into polymer and phase separation into a polymer-existing region and a liquid crystal-existing region, thereby forming a liquid crystal layer between the substrates having a phase difference distribution corresponding to that of aberrations to be corrected.

2. The method as claimed in claim 1, wherein the liquid crystal layer is formed to exhibit a nano polymer dispersed liquid crystal (PDLC) structure Where the size and density distribution of liquid crystal droplets corresponds to that of the aberrations to be corrected.

3. The method as claimed in claim 2, wherein the gray scale mask has an absorption rate distribution corresponding to the distribution of at least one of spherical aberration caused by a thickness difference in an optical information storage medium, spherical aberration introduced by a thickness difference in the optical information storage medium when the working distance of an objective lens changes, coma aberration caused by a tilt of the optical information storage medium, and coma aberration introduced by the tilt of the optical information storage medium when the objective lens shifts or has a positive- or negative-type two-dimensional (2-D) parabolic absorption rate distribution.

4. The method as claimed in claim 1, wherein the gray scale mask has an absorption rate distribution corresponding to the distribution of at least one of spherical aberration caused by a thickness difference in an optical information storage medium, spherical aberration introduced by a thickness difference in the optical information storage medium when the working distance of an objective lens changes, coma aberration caused by a tilt of the optical information storage medium, and coma aberration introduced by the tilt of the optical information storage medium when the objective lens shifts or has a positive- or negative-type 2-D parabolic absorption rate distribution.

5. The method as claimed in claim 1, wherein the liquid crystal layer is formed to exhibit a polymer network liquid crystal (PNLC) structure in which monomers are polymerized to form a polymer network and liquid crystals are entrapped in the polymer network, and the phase difference distribution is opposite to that of aberrations to be corrected.

6. The method as claimed in claim 5, wherein the gray scale mask has an absorption rate distribution corresponding to the distribution of at least one of spherical aberration caused by a thickness difference in an optical information storage medium, spherical aberration introduced by a thickness difference in the optical information storage medium when the working distance of an objective lens changes, coma aberration caused by a tilt of the optical information storage medium, and coma aberration introduced by the tilt of the optical information storage medium when the objective lens shifts or has a positive- or negative-type 2-D parabolic absorption rate distribution.

7. A liquid crystal device for compensating for aberration comprising:

a pair of transparent substrates; and a liquid crystal layer formed between the substrates having a phase difference distribution corresponding to the distribution of aberrations to be corrected, wherein the liquid crystal layer is formed by positioning a gray scale mask having an absorption rate distribution corresponding to the distribution of aberrations to be corrected on a liquid crystal cell containing a mixture of liquid crystals and monomers injected between the substrates; and irradiating the liquid crystal cell on which the gray scale mask has been positioned with UV light so that the monomers undergo photopolymerization into polymer and phase separation into a polymer-existing region and a liquid crystal-existing region.

8. The liquid crystal device as claimed in claim 7, wherein the liquid crystal layer is formed to exhibit a nano polymer dispersed liquid crystal (PDLC) structure where the size and density distribution of liquid crystal droplets corresponds to the distribution of the aberrations to be corrected.

9. The liquid crystal device as claimed in claim 8, wherein the gray scale mask has an absorption rate distribution corresponding to the distribution of at least one of spherical aberration caused by a thickness difference in an optical information storage medium, spherical aberration introduced by a thickness difference in the optical information storage medium when the working distance of an objective lens changes, coma aberration caused by a tilt of the optical information storage medium, and coma aberration introduced by the tilt of the optical information storage medium when the objective lens shifts or has a positive- or negative-type two-dimensional (2-D) parabolic absorption rate distribution.

10. The liquid crystal device as claimed in claim 7, wherein the gray scale mask has an absorption rate distribution corresponding to the distribution of at least one of spherical aberration caused by a thickness difference in an optical information storage medium, spherical aberration introduced by a thickness difference in the optical information storage medium when the working distance of an objective lens changes, coma aberration caused by a tilt of the optical information storage medium, and coma aberration introduced by the tilt of the optical information storage medium when the objective lens shifts or has a positive- or negative-type 2-D parabolic absorption rate distribution.

11. The liquid crystal device as claimed in claim 7, wherein the liquid crystal layer is formed to exhibit a polymer network liquid crystal (PNLC) structure in which monomers are polymerized to form a polymer network and liquid crystals are entrapped in the polymer network, and the phase difference distribution is opposite to that of aberrations to be corrected.

12. The liquid crystal device as claimed in claim 11, wherein the gray scale mask has an absorption rate distribution corresponding to the distribution of at least one of spherical aberration caused by a thickness difference in an optical information storage medium, spherical aberration introduced by a thickness difference in the optical information storage medium when the working distance of an objective lens changes, coma aberration caused by a tilt of the optical information storage medium, and coma aberration introduced by the tilt of the optical information storage medium when the objective lens shifts or has a positive- or negative-type 2-D parabolic absorption rate distribution.

13. An optical pickup comprising:

a light source;

an objective lens arranged to focus light emitted by the light source to a spot on an optical information storage medium;

a photo-detector arranged to receive light reflected from the optical information storage medium and detect an information signal and/or an error signal; and a liquid crystal device arranged to compensate for aberration, and comprising:

a pair of substrates; and a liquid crystal layer formed between the substrates having a phase difference distribution corresponding to the distribution of aberrations to be corrected, wherein the liquid crystal layer is formed by positioning a gray scale mask having an absorption rate distribution corresponding to the distribution of aberrations to be corrected on a liquid crystal cell containing a mixture of liquid crystals and monomers injected between the substrates; and irradiating the liquid crystal cell on which the gray scale mask has been positioned with UV light so that the monomers undergo photopolymerization into polymer and phase separation into a polymer-existing region and a liquid crystal-existing region.

14. The optical pickup as claimed in claim 13, wherein the liquid crystal layer in the liquid crystal device is formed to have a nano polymer dispersed liquid crystal (PDLC) structure where the size and density distribution of liquid crystal droplets corresponds to that of the aberrations to be corrected.

15. The optical pickup as claimed in claim 13, wherein the liquid crystal layer in the liquid crystal device is formed to exhibit a polymer network liquid crystal (PNLC) structure in which monomers are polymerized to form a polymer network and liquid crystals are entrapped in the polymer network, and the phase difference distribution is opposite to that of aberrations to be corrected.

16. The optical pickup as claimed in claim 15, wherein the liquid crystal device comprises a first liquid crystal device arranged to correct aberration for light incident on an information storage surface of the optical information storage medium, and a second liquid crystal device arranged adjacent to the first liquid crystal device to correct aberration for light reflected from the information storage surface to the photo-detector.

17. The optical pickup as claimed in claim 16, further comprising a waveplate disposed between either the first or the second liquid crystal device and the objective lens, to change the polarization of incident light.

18. The optical pickup as claimed in claim 13, wherein the liquid crystal device has a phase difference distribution that can compensate for at least one of spherical aberration caused by a thickness difference in the optical information storage medium, spherical aberration introduced by a thickness difference in the optical information storage medium when the working distance of the objective lens changes, coma aberration caused by a tilt of the optical information storage medium, and coma aberration introduced by the tilt of the optical information storage medium when the objective lens shifts.

19. The optical pickup as claimed in claim 13, wherein the liquid crystal device has a positive- or negative-type two-dimensional (2-D) parabolic phase difference distribution.

20. An optical recording and/or reproducing apparatus including an optical pickup that is installed movably along a radial direction of an optical information storage medium and reproduces and/or records information from and/or on the optical information storage medium and a controller controlling the optical pickup, wherein the optical pickup is the optical pickup as claimed in claim 13.

21. The optical recording and/or reproducing apparatus as claimed in claim 20, wherein the liquid crystal layer in the liquid crystal device is formed to exhibit a nano polymer dispersed liquid crystal (PDLC) structure where the size and density distribution of liquid crystal droplets corresponds to that of the aberrations to be corrected.

22. The optical recording and/or reproducing apparatus as claimed in claim 20, wherein the liquid crystal layer in the liquid crystal device is formed to exhibit a polymer network liquid crystal (PNLC) structure in which monomers are polymerized to form a polymer network and liquid crystals are entrapped in the polymer network, and the phase difference distribution is opposite to that of aberrations to be corrected.

23. The optical recording and/or reproducing apparatus as claimed in claim 22, wherein the liquid crystal device comprises a first liquid crystal device arranged to correct aberration for light incident on an information storage surface of the optical information storage medium, and a second liquid crystal device arranged adjacent to the first liquid crystal device to correct aberration for light reflected from the information storage surface to the photo-detector.

24. The optical recording and/or reproducing apparatus as claimed in claim 23, wherein the optical pickup further comprises a waveplate disposed between either the first or the second liquid crystal device and the objective lens to change the polarization of incident light.

25. The optical recording and/or reproducing apparatus as claimed in claim 20, wherein the liquid crystal device in the optical pickup has a phase difference distribution that can compensate for at least one of spherical aberration caused by a thickness difference in the optical information storage medium, spherical aberration introduced by a thickness difference in the optical information storage medium when the working distance of the objective lens changes, coma aberration caused by a tilt of the optical information storage medium, and coma aberration introduced by the tilt of the optical information storage medium when the objective lens shifts.

26. The optical recording and/or reproducing apparatus as claimed in claim 20, wherein the liquid crystal device in the optical pickup has a positive- or negative-type two-dimensional (2-D) parabolic phase difference distribution.

27. An optical pickup comprising:
a light source;
an objective lens arranged to focus light emitted from the light source on an optical information storage medium;
a photo-detector arranged to receive light reflected from the optical information storage medium and detect an information signal and/or an error signal;
a first liquid crystal device arranged such that a direction of polarization of light emitted from the light source is coincident with a major axis direction of liquid crystal molecules included therein before an application of an electric field in order to correct aberration of light incident on a surface of the optical information storage medium; and
a second liquid crystal device arranged such that a direction of polarization of light reflected from the surface of the optical information storage medium is coincident with a major axis direction of liquid crystal molecules included therein in order to correct aberration of light reflected from the surface of the optical information storage medium to the photo-detector,
wherein the first and second liquid crystal devices each comprises a pair of substrates, and a liquid crystal layer formed between the substrates, and
wherein the liquid crystal layer is formed between the substrates by positioning a gray scale mask having an absorption rate distribution corresponding to a predicted distribution of aberrations to be corrected on a liquid crystal cell containing a mixture of liquid crystals and monomers injected between the substrates; and irradiating the liquid crystal cell on which the gray scale mask has been positioned with light so that the monomers undergo photopolymerization into polymer and phase separation into a polymer-existing region and a liquid crystal-existing region.

28. The optical pickup as claimed in claim 27, wherein the liquid crystal layer in the first and second liquid crystal devices is formed to exhibit a nano polymer dispersed liquid crystal (PDLC) structure where the size and density distribution of liquid crystal droplets corresponds to that of aberrations to be corrected.

29. The optical pickup as claimed in claim 27, wherein the liquid crystal layer in the first and second liquid crystal devices is formed to exhibit a polymer network liquid crystal (PNLC) structure in which monomers are polymerized to form a polymer network and liquid crystals are entrapped in the polymer network, and the phase difference distribution is opposite to that of aberrations to be corrected.

30. The optical pickup as claimed in claim 27, further comprising a waveplate disposed between either the first or the second liquid crystal device and the objective lens, to change the polarization of incident light.

31. The optical pickup as claimed in claim 27, wherein each of the first and second liquid crystal devices has a phase difference distribution that can compensate for at least one of spherical aberration caused by a thickness difference in the optical information storage medium, spherical aberration introduced by a thickness difference in the optical information storage medium when the working distance of the objective lens changes, coma aberration caused by a tilt of the optical information storage medium, and coma aberration introduced by the tilt of the optical information storage medium when the objective lens shifts.

32. The optical pickup as claimed in claim 27, wherein each of the first and second liquid crystal devices has a positive- or negative-type two-dimensional (2-D) parabolic phase difference distribution.

33. A method of manufacturing a liquid crystal device, comprising:
positioning a gray scale mask having an absorption rate distribution corresponding to that of aberrations to be corrected on a liquid crystal cell containing a mixture of liquid crystals and monomers injected between adjacent substrates; and
irradiating the liquid crystal cell on which the gray scale mask has been positioned with UV light so that the monomers are photopolymerized into polymer, thereby forming a liquid crystal layer between the adjacent substrates having a phase difference distribution that can compensate for aberrations.

34. The method as claimed in claim 33, wherein the liquid crystal layer is formed to exhibit a nano polymer dispersed liquid crystal (PDLC) structure where the size and density distribution of liquid crystal droplets corresponds to that of the aberrations to be corrected.

35. The method as claimed in claim 33, wherein the liquid crystal layer is formed to exhibit a polymer network liquid crystal (PNLC) structure in which monomers are polymerized to form a polymer network and liquid crystals are entrapped in the polymer network, and the phase difference distribution is opposite to that of aberrations to be corrected.

36. The method as claimed in claim 33, wherein the gray scale mask has an absorption rate distribution corresponding to the distribution of at least one of spherical aberration caused by a thickness difference in an optical information storage medium, spherical aberration introduced by a thickness difference in the optical information storage medium when the working distance of an objective lens changes, coma aberration caused by a tilt of the optical information storage medium, and coma aberration introduced by the tilt of the optical information storage medium when the objective lens shifts or has a positive- or negative-type 2-D parabolic absorption rate distribution.

* * * * *